United States Patent
Stanfill

(10) Patent No.: US 9,811,570 B2
(45) Date of Patent: Nov. 7, 2017

(54) MANAGING STORAGE OF DATA FOR RANGE-BASED SEARCHING

(75) Inventor: Craig W. Stanfill, Lincoln, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

(21) Appl. No.: 13/543,339

(22) Filed: Jul. 6, 2012

(65) Prior Publication Data

US 2013/0013606 A1    Jan. 10, 2013

Related U.S. Application Data

(60) Provisional application No. 61/505,760, filed on Jul. 8, 2011.

(51) Int. Cl.
     *G06F 17/30*       (2006.01)

(52) U.S. Cl.
     CPC .. *G06F 17/30551* (2013.01); *G06F 17/30297* (2013.01); *G06F 17/30353* (2013.01); *G06F 17/30548* (2013.01)

(58) Field of Classification Search
     CPC ......... G06F 17/30336; G06F 17/30353; G06F 17/30634
     USPC ........................................................ 707/711
     See application file for complete search history.

(56) References Cited

U.S. PATENT DOCUMENTS

| | | | |
|---|---|---|---|
| 4,775,932 A | 10/1988 | Oxley et al. | |
| 5,659,733 A | 8/1997 | Yamashita | |
| 5,737,593 A | 4/1998 | Agrawal et al. | |
| 6,278,992 B1 | 8/2001 | Curtis et al. | |
| 6,309,424 B1 | 10/2001 | Fallon | |
| 6,510,425 B1 | 1/2003 | Okamoto et al. | |
| 6,658,405 B1 | 12/2003 | Ozbutun | |
| 6,873,993 B2 | 3/2005 | Charlesworth et al. | |
| 6,970,866 B1 | 11/2005 | Pravetz et al. | |
| 6,996,573 B2 | 2/2006 | Syvanne | |
| 7,885,932 B2 | 2/2011 | Kulkarni et al. | |
| 8,214,331 B2 | 7/2012 | Kulkarni et al. | |
| 8,229,902 B2 | 7/2012 | Vishniac et al. | |
| 8,489,553 B2 | 7/2013 | Kukarni et al. | |

(Continued)

FOREIGN PATENT DOCUMENTS

| | | |
|---|---|---|
| JP | 63-037425 | 2/1988 |
| JP | 64-058018 | 3/1989 |

(Continued)

OTHER PUBLICATIONS

Finet, Catherine, Miguel Martín, and Rafael Payá. "Numerical index and renorming." Proceedings of the American Mathematical Society 131.3 (2003): 871-877.*

(Continued)

*Primary Examiner* — Nan Hutton
(74) *Attorney, Agent, or Firm* — Fish & Richardson P.C.

(57) ABSTRACT

In general, a value of a numerical attribute of a record stored in a data structure is received. A numerical range is generated that includes the value of the numerical attribute. An entry is stored, in an index associated with the data structure, that specifies a location of the record within the data structure and that includes a first index key and a second index key. The first index key corresponds to a value of an attribute of the record different from the numerical attribute, and the second index key corresponds to the generated numerical range.

54 Claims, 15 Drawing Sheets

(56) References Cited

U.S. PATENT DOCUMENTS

| | | |
|---|---|---|
| 2001/0005885 A1 | 6/2001 | Elgamal et al. |
| 2002/0035556 A1 | 3/2002 | Shah |
| 2002/0052870 A1 | 5/2002 | Charlesworth et al. |
| 2002/0073096 A1 | 6/2002 | Shaath et al. |
| 2003/0195869 A1 | 10/2003 | Bhattacharjee et al. |
| 2004/0049485 A1 | 3/2004 | Obermaier et al. |
| 2004/0216091 A1* | 10/2004 | Groeschel ............... 717/128 |
| 2004/0236743 A1 | 11/2004 | Blaicher et al. |
| 2005/0097298 A1 | 5/2005 | Cohen |
| 2006/0184563 A1 | 8/2006 | Potter |
| 2007/0005598 A1 | 1/2007 | Okamoto et al. |
| 2008/0015945 A1 | 1/2008 | Goldstein |
| 2008/0104149 A1 | 5/2008 | Vishniac et al. |
| 2008/0235377 A1* | 9/2008 | Fukuzawa et al. ........... 709/225 |
| 2009/0136130 A1* | 5/2009 | Piper ............................ 382/170 |
| 2009/0248645 A1 | 10/2009 | Ogura |
| 2009/0287986 A1 | 11/2009 | Vishniac et al. |
| 2010/0034190 A1* | 2/2010 | Yun et al. ...................... 370/350 |
| 2010/0169274 A1 | 7/2010 | Kulkarni et al. |
| 2011/0196844 A1 | 8/2011 | Kulkarni et al. |
| 2012/0271862 A1 | 10/2012 | Kulkarni et al. |
| 2012/0284240 A1 | 11/2012 | Vishniac et al. |

FOREIGN PATENT DOCUMENTS

| | | |
|---|---|---|
| JP | 05-257774 | 10/1993 |
| JP | 1995-160557 | 6/1995 |
| JP | H07-160557 | 6/1995 |
| JP | 07-287716 | 10/1995 |
| JP | H08-23865 | 3/1996 |
| JP | H08-255170 | 10/1996 |
| JP | H11-096170 | 4/1999 |
| JP | 3431149 | 7/2003 |
| JP | 2005-509368 | 4/2005 |
| JP | 2010-506311 | 2/2010 |
| WO | WO9320516 | 10/1993 |
| WO | WO03041340 | 5/2003 |
| WO | WO2008/043082 | 4/2008 |

OTHER PUBLICATIONS

Song, Zhexuan, and Nick Roussopoulos. "SEB-tree: An approach to index continuously moving objects." International Conference on Mobile Data Management. Springer, Berlin, Heidelberg, 2003.*
Transaction History, U.S. Appl. No. 11/555,458.
Transaction History, U.S. Appl. No. 13/552,706.
Transaction History, U.S. Appl. No. 12/721,214.
Transaction History, U.S. Appl. No. 12/983,375.
Transaction History, U.S. Appl. No. 13/540,125.
Korean Office Action, with English Translation, KR application No. 10-2009-7011230, dated Jun. 14, 2013, 10 pages.
International Search Report and Written Opinion, PCT/US2012/045759, dated Oct. 2, 2012, 11 pages.
Chen, Z. et al., "Query Optimization in Compressed Database Systems" *ACM SIGMOD* May 21-24, 2001, Santa Barbara, California, USA.
Comer, Douglas, "The Ubiquitous B-Tree." *Computing Surveys*, vol. 11, No. 2, Jun. 1979, pp. 121-137.
Chinese Office Action (English translation) issued in CN application No. 200780040946.9, dated Mar. 30, 2011, 7 pages.
International Search Report and Written Opinion issued in PCT application No. PCT/US2010/026817, dated May 10, 2010, 13 pages.
Japanese Office Action, with English Translation, JP Application No. 2009-535408, dated Aug. 8, 2012, 6 pages.
Stanfill, Craig. "Massively Parallel Information Retrieval for Wide Area Information Servers," Systems, Man, and Cybernetics, 1991. Decision Aiding for Complex Systems, Conference Proceedings, 1991 IEEE International Conference, Oct. 13-16, 1991, vol. 1, pp. 679-682.
Xiukun, Wang et al., "Machine translation dictionary based on Hash method," English Translation included. Journal of Dalian University of Technology, vol. 36, No. 3, May 1996.10 pages.
U.S. Appl. No. 11/555,458, filed Nov. 1, 2006, U.S. Pat. No. 8,229,902, Vishniac et al., Jul. 2012, Managing Storage of Individually Accessible Data Units.
U.S. Appl. No. 13/552,706, filed Jul. 19, 2012, Managing Storage of Individually Accessible Data Units.
U.S. Appl. No. 12/421,214, filed Mar. 10, 2010, U.S. Pat. No. 7,885,932, Kulkarni et al., Feb. 2011, Managing Storage of Individually Accessible Data Units.
U.S. Appl. No. 12/983,375, filed Jan. 3, 2011, U.S. Pat. No. 8,214,331, Kulkarni et al., Jul. 2012, Managing Storage of Individually Accessible Data Units.
U.S. Appl. No. 13/540,125, filed Jul. 2, 2012, Managing Storage of Individually Accessible Data Units.
Japanese Office Action, with English Translation, JP Application No. 2012-557017, dated Jan. 9, 2014, 6 pages.
Watanabe, Noriyasu, et al., "Evaluation of Two-level Signature Files as Set-Valued Object Retrieval Facilities," (with English Translation) Proceedings of the 49th National Convention of IPSJ (4) Japan, Information Processing Society of Japan, Sep. 20, 1994, pp. 4-275 to 4-276.
Extended European Search Report issued in European Application No. 07854474.9 dated Jul. 1, 2016 (9 pages).
Australian Exam Report in Application No. 2012282870, dated Aug. 23, 2016 (3 pages).
Japanese Office Action, with English Translation, JP Application 2014-519067, dated Jun. 2, 2016.
Chinese Office Action issued in CN Application No. 201080066735.4, dated Jul. 20, 2016.
Korean Office Action, KR application No. 10-2012-7026525, dated Jul. 4, 2016 (6 pages).

* cited by examiner

| DISTINCT KEYS | 10 | 11 | 12 | 13 | 14 | 15 | 16 | 17 | 18 | 19 | 20 | |
|---|---|---|---|---|---|---|---|---|---|---|---|---|
| 100 | 1.1% | 0.1% | | | | | | | | | | 100 |
| 200 | 8.7% | 1.1% | 0.1% | | | | | | | | | 200 |
| 500 | 54.3% | 15.1% | 2.2% | 0.2% | 0.0% | | | | | | | 500 |
| 1,000 | 92.2% | 54.3% | 15.1% | 2.2% | 0.2% | 0.0% | | | | | | 1,000 |
| 2,000 | 99.8% | 92.2% | 54.2% | 15.1% | 2.2% | 0.2% | 0.0% | | | | | 2,000 |
| 5,000 | | 100.0% | 97.0% | 69.5% | 24.7% | 4.4% | 0.5% | 0.00% | | | | 5,000 |
| 10,000 | | | 100.0% | 97.0% | 69.5% | 24.7% | 4.4% | 0.48% | 0.04% | 0.00% | | 10,000 |
| 20,000 | | | | 100.0% | 97.0% | 69.5% | 24.7% | 4.36% | 0.48% | 0.04% | 0.00% | 20,000 |
| 50,000 | | | | | 100.0% | 99.1% | 82.4% | 37.51% | 8.11% | 1.01% | 0.09% | 50,000 |
| 100,000 | | | | | | 100.0% | 99.1% | 82.39% | 37.51% | 8.11% | 1.01% | 100,000 |
| 200,000 | | | | | | | 100.0% | 99.11% | 82.39% | 37.51% | 8.11% | 200,000 |
| 500,000 | | | | | | | 100.0% | 100.00% | 99.81% | 91.47% | 52.59% | 500,000 |
| 1,000,000 | | | | | | | | 100.00% | 100.00% | 99.81% | 91.47% | 1,000,000 |
| 2,000,000 | | | | | | | | | 100.00% | 100.00% | 99.81% | 2,000,000 |
| 5,000,000 | | | | | | | | | | 100.00% | 100.00% | 5,000,000 |
| 10,000,000 | | | | | | | | | | | 100.00% | 10,000,000 |
| | 10 | 11 | 12 | 13 | 14 | 15 | 16 | 17 | 18 | 19 | 20 | | log₂(SIZE)

FIG. 3A

| DISTINCT KEYS | 21 | 22 | 23 | 24 | 25 | 26 | 27 | 28 | |
|---|---|---|---|---|---|---|---|---|---|
| 20,000 | 0.00% | 0.00% | | | | | | | 20,000 |
| 50,000 | 0.01% | 0.00% | 0.00% | | | | | | 50,000 |
| 100,000 | 0.09% | 0.01% | 0.00% | 0.00% | | | | | 100,000 |
| 200,000 | 1.01% | 0.09% | 0.01% | 0.00% | 0.00% | | | | 200,000 |
| 500,000 | 14.28% | 2.07% | 0.20% | 0.02% | 0.00% | 0.00% | | | 500,000 |
| 1,000,000 | 52.58% | 14.28% | 2.07% | 0.20% | 0.02% | 0.00% | 0.00% | | 1,000,000 |
| 2,000,000 | 91.47% | 52.58% | 14.28% | 2.07% | 0.20% | 0.02% | 0.00% | 0.00% | 2,000,000 |
| 5,000,000 | 99.97% | 96.65% | 67.93% | 23.52% | 4.06% | 0.44% | 0.04% | 0.00% | 5,000,000 |
| 10,000,000 | 100.00% | 99.97% | 96.65% | 67.93% | 23.52% | 4.06% | 0.44% | 0.04% | 10,000,000 |
| 20,000,000 | 100.00% | 100.00% | 99.97% | 96.65% | 67.93% | 23.52% | 4.06% | 0.44% | 20,000,000 |
| 50,000,000 | | 100.00% | 100.00% | 100.00% | 98.97% | 81.18% | 36.01% | 7.61% | 50,000,000 |
| 100,000,000 | | | 100.00% | 100.00% | 100.00% | 98.97% | 81.18% | 36.01% | 100,000,000 |
| | 21 | 22 | 23 | 24 | 25 | 26 | 27 | 28 | | log₂(SIZE)

FIG. 3B

MANAGING STORAGE OF DATA FOR RANGE-BASED SEARCHING

RELATED APPLICATIONS

This application claims priority to U.S. Application Ser. No. 61/505,760, filed on Jul. 8, 2011, the contents of which are incorporated herein by reference in their entirety.

BACKGROUND

The invention relates to managing storage of data for range-based searching.

A database system can store individually accessible units of data or "records" in any of a variety of formats. Each record may correspond to a logical entity such as a credit card transaction and may have an associated primary key used to uniquely identify the record. The record can include multiple values associated with respective fields of a record format. The records can be stored within one or more files (e.g., flat files or structured data files such as XML files). Within compressed database systems, individual records or values within records may be compressed when stored and decompressed when accessed to reduce the storage requirements of the system.

SUMMARY

In one aspect, in general, a value of a numerical attribute of a record stored in a data structure is received. A numerical range is generated that includes the value of the numerical attribute. An entry is stored, in an index associated with the data structure, that specifies a location of the record within the data structure and that includes a first index key and a second index key. The first index key corresponds to a value of an attribute of the record different from the numerical attribute, and the second index key corresponds to the generated numerical range.

Aspects can include one or more of the following features.

The value of the numerical attribute is represented by a time stamp, and the numerical range defines a range of time.

Generating the numerical range includes determining a first value in time units that separates a time corresponding to the time stamp from a predetermined point in time.

The numerical range is a time range of a predetermined time duration, and generating the numerical range includes dividing the first value by the predetermined time duration to provide a quotient that represents the numerical range.

The entry further specifies a location, within the data structure, of a second record that is associated with the first index key and the second index key.

The first record and the second record include values of the numerical attribute represented by different time stamps.

A query is received that requests the retrieval of records that are associated with the first index key and that are associated with a time between a first time and a second time.

Respective numerical ranges are generated for the first time and the second time.

Generating the respective numerical ranges includes determining a second value in time units that separates the first time from a second predetermined point in time, and determining a third value in time units that separates the second time from the second predetermined point in time.

Generating the respective numerical ranges includes dividing the second value by the predetermined time duration to provide a quotient that represents a numerical range for the first time, and dividing the third value by the predetermined time duration to provide a quotient that represents a numerical range for the second time.

Entries are identified within the index that include the first index key and that include a second index key that corresponds to a numerical range that is equal to the numerical range for the first time or the numerical range for the second time or that is between the respective numerical ranges for the first time and the second time.

In another general aspect, a computer-readable storage medium stores a computer program that includes instructions for causing a computing system to receive a value of a numerical attribute of a record stored in a data structure and generate a numerical range that includes the value of the numerical attribute. The instructions further cause the computer system to store, in an index associated with the data structure, an entry that specifies a location of the record within the data structure and that includes a first index key and a second index key, the first index key corresponding to a value of an attribute of the record different from the numerical attribute, and the second index key corresponding to the generated numerical range.

In a further general aspect, a computing system includes an input device or port configured to receive a value of a numerical attribute of a record stored in a data structure. The computing system further includes at least one processor configured to: generate a numerical range that includes the value of the numerical attribute; and store, in an index associated with the data structure, an entry that specifies a location of the record within the data structure and that includes a first index key and a second index key, the first index key corresponding to a value of an attribute of the record different from the numerical attribute, and the second index key corresponding to the generated numerical range.

In another general aspect, a computing system includes means for receiving a value of a numerical attribute of a record stored in a data structure; and means for indexing the record. The indexing includes generating a numerical range that includes the value of the numerical attribute; and storing, in an index associated with the data structure, an entry that specifies a location of the record within the data structure and that includes a first index key and a second index key, the first index key corresponding to a value of an attribute of the record different from the numerical attribute, and the second index key corresponding to the generated numerical range.

Aspects can include one or more of the following advantages.

Techniques for managing storage and indexing of data are able to reduce the amount of records that must be decompressed (if the records are compressed), loaded into memory, and/or discarded for failing to match a given query. In some examples, records are stored in groups according to a numerical attribute, such as time (e.g., if the records correspond to telephone calls, the records may be stored in data files that represent calls for a single day based on the time a given call was placed). An index may be provided for each stored group of records that identifies the location of each record within a respective data file.

In some examples, it may be desirable to locate one or more records that match parameters specified in a query. If one of the parameters specified in the query relates to a range of time, however, some systems may require that a data file representing an entire day be decompressed (if the data file is compressed), loaded into memory, and matched against the parameters, even if the time period is only relatively small (e.g., ten minutes of that day). Accordingly, this disclosure provides techniques for providing entries in an index that include numerical ranges (e.g., ranges of time, sometimes referred to as time quanta), and that can be used to efficiently search indexes to locate records that potentially satisfy a query while decompressing, loading, and discarding smaller amounts of records. Many of the techniques described herein can be used to create new indexes or to update existing indexes.

Other features and advantages of the invention will become apparent from the following description, and from the claims.

DESCRIPTION OF DRAWINGS

FIGS. 3A and 3B are tables showing false positive probabilities for different signature sizes.

DESCRIPTION

Figure 1:
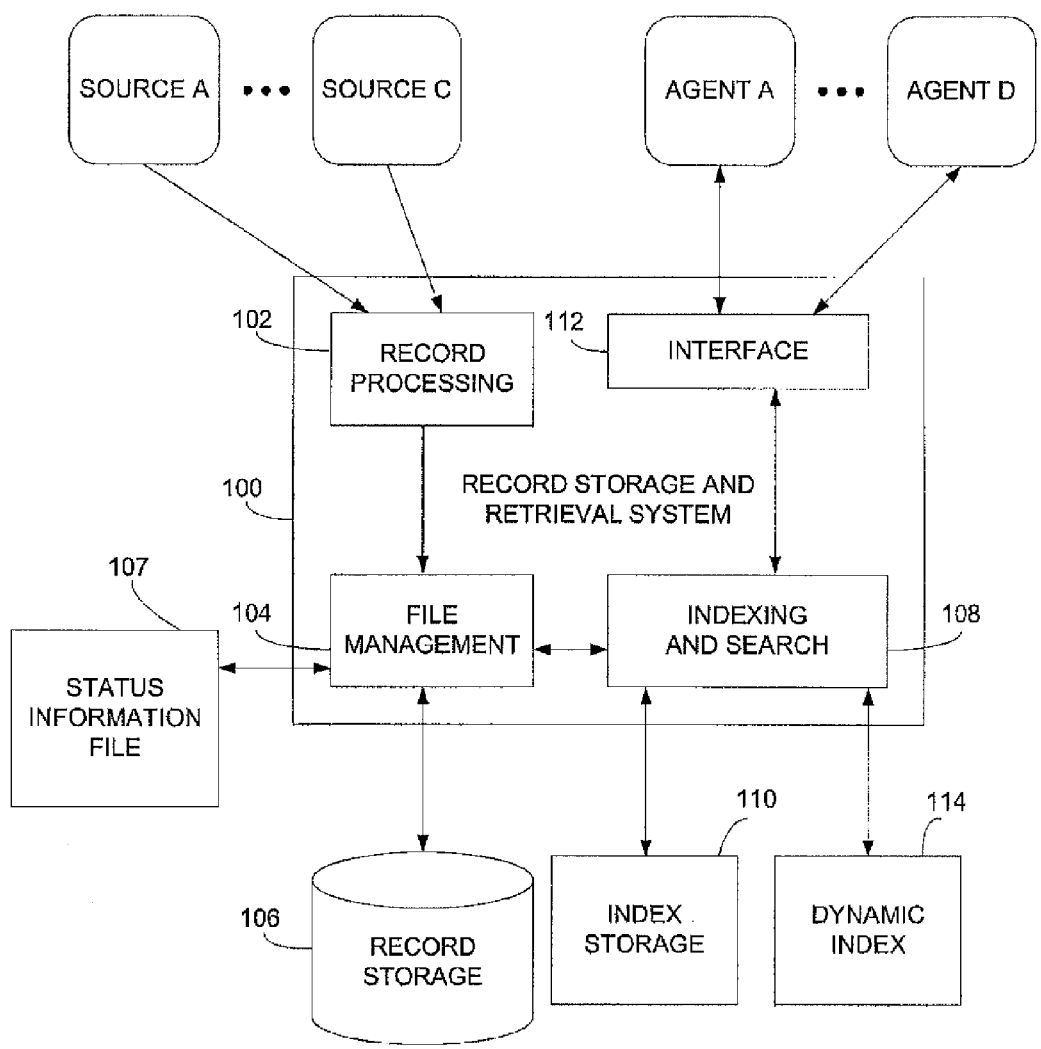
FIG. 1 is a block diagram of a system for storing and retrieving records.

Referring to FIG. 1, a record storage and retrieval system 100 accepts data from one or more sources, such as SOURCE A-SOURCE C. The data include information that can be represented as individually accessible units of data. For example, a credit card company may receive data representing individual transactions from various retail companies. Each transaction is associated with values representing attributes such as a customer name, a date, a purchase amount, etc. A record processing module 102 ensures that the data is formatted according to a predetermined record format so that the values associated with a transaction are stored in a record. In some cases this may include transforming the data from the sources according to the record format. In other cases, one or more sources may provide the data already formatted according to the record format.

The record processing module 102 prepares records for storage in various types of data structures depending on various factors such as whether it may be necessary to access the stored records quickly. When preparing records for fast accessibility in an appendable lookup file, the processing module 102 appends the records as they arrive into the appendable lookup file and maintains an in-memory index, as described in more detail below. When preparing records for compressed storage in a compressed record file, the processing module 102 sorts the records by a primary key value that identifies each record (e.g., either a unique key identifying a single record, or a key that identifies multiple updated versions of a record), and divides the records into sets of records that correspond to non-overlapping ranges of primary key values. For example, each set of records may correspond to a predetermined number of records (e.g., 100 records).

A file management module 104 manages both the appendable lookup files (in situations in which they are used) and compressed lookup files. When managing compressed record files, the file management module 104 compresses each set of records into a compressed block of data. These compressed blocks are stored in a compressed record file in a record storage 106 (e.g., in a non-volatile storage medium such as one or more hard disk drives).

The system 100 also includes an indexing and search module 108 that provides an index that includes an entry for each of the blocks in a compressed record file. The index is used to locate a block that may include a given record, as described in more detail below. The index can be stored in an index file in an index storage 110. For example, while the index file can be stored in the same storage medium as the compressed record file, the index file may preferably be stored in a relatively faster memory (e.g., a volatile storage medium such as a Dynamic Random Access Memory) since the index file is typically much smaller than the compressed record file. The index can also be a dynamic index 114 that is maintained as an in-memory data structure. Some examples of a dynamic index 114 are hash tables, binary trees, and b-trees. The indexing and search module 108 also provides an interface for searching appendable lookup files, as described in more detail below.

In alternative implementations of the system 100, the sets of records can be processed to generate blocks using other functions in addition to or instead of compression to combine the records in some way (i.e., so that the block is not merely a concatenated set of records). For example, some systems may process a set of records to generate blocks of encrypted data.

An interface module 112 provides access to the stored records to human and/or computer agents, such as AGENT A-AGENT D. For example, the interface module 112 can implement an online account system for credit card customers to monitor their transactions. A request for transaction information meeting various criteria can be processed by the system 100 and corresponding records can be retrieved from within compressed blocks stored in the record storage 106.

A stream of incoming records from one or more sources may be temporarily stored before being processed to generate a compressed record file.

Figure 2A:
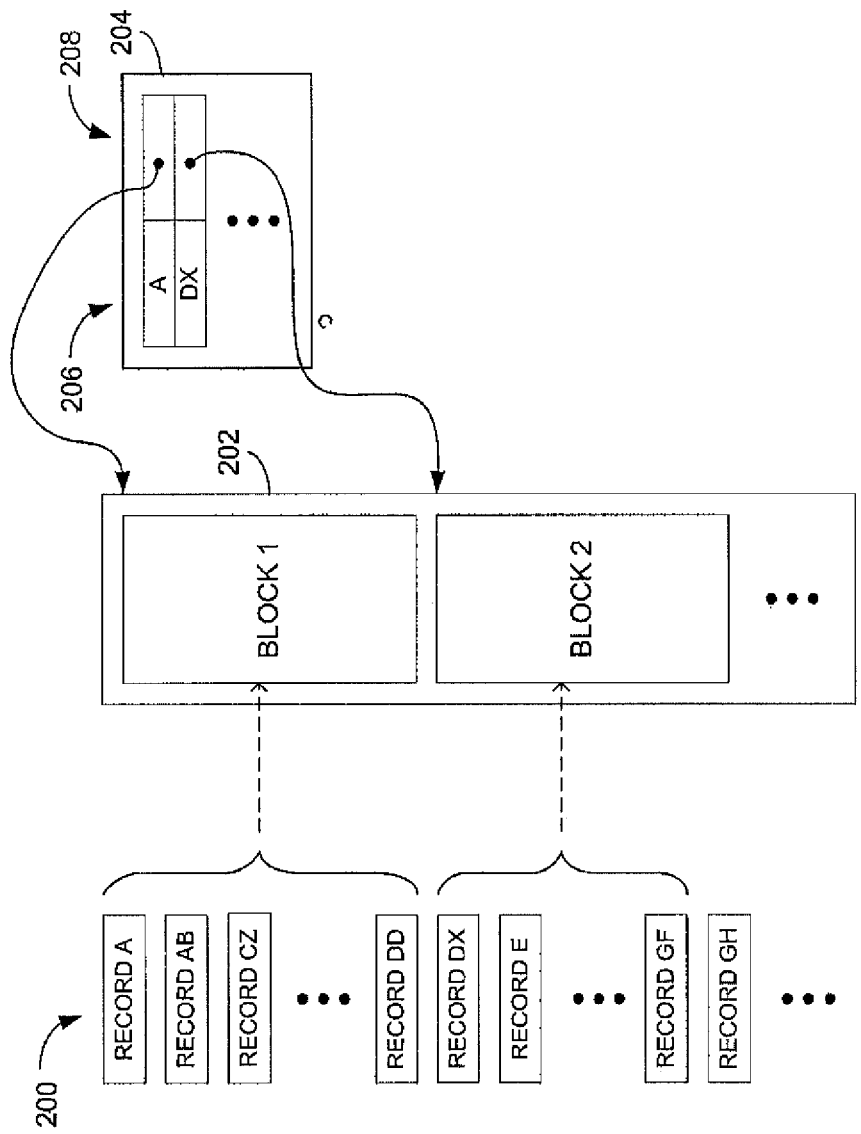
FIGS. 2A, 2B, 2C, and 2D are schematic diagrams of data processed by and stored in the system.

FIGS. 2A-2D, 3A-3B, and 4A-4B show examples of managing records in compressed record files. Referring to FIG. 2A, the system 100 receives a set of records 200 to be stored in a compressed record file 202, and sorts the records according to values of a primary key.

A primary key value can uniquely identify a given item in a database that may be represented by one or more records (e.g., each record having a given primary key value may correspond to a different updated version of the item). The primary key can be a "natural key" that corresponds to one or more existing fields of a record. If there is no field that is guaranteed to be unique for each item, the primary key may be a compound key comprising multiple fields of a record that together are guaranteed or highly likely to be unique for each item. Alternatively, the primary key can be a "synthetic key" which can be assigned to each record after being received. For example, the system 100 can assign unique primary key values as sequentially incremented integers, or some other sequence of monotonically progressing values (e.g., time stamps). In this case, records representing different versions of the same item may be assigned different synthetic key values. If integers are used, the range of possible primary key values (e.g., as determined by the number of bits used) can be large enough so that if the primary key rolls over, any record previously assigned a given primary key value has been removed from the compressed record file. For example, old transactions may be removed and archived or discarded.

In the example shown in FIG. 2A, the records 200 are identified by alphabetically sorted primary key values: A, AB, CZ, . . . . The system 100 compresses a first set of N records having primary key values A-DD to generate a corresponding compressed block labeled BLOCK 1. The next set of records includes the next N of the sorted records having primary key values DX-GF. The file management module 104 can use any of a variety of lossless data compression algorithms (e.g., Lempel-Ziv type algorithms). Each successive compressed block is combined form a compressed record file 202.

The number N of records used to generate a compressed block, can be selected to trade off between compression efficiency and decompression speed. The compression may reduce the size of the data on average by a given factor R that depends on the nature of the data being compressed and on the size of the data being compressed (e.g., R is typically smaller when more data is being compressed). The compression may also have an associated overhead (e.g., compression related data) of average size O. The average size of the resulting compressed record file generated from M records each of size X can be expressed as $[MIN](RNX+O)$, which for a large number of blocks can be approximated as $RMX+OM/N$. Thus, a larger value of N can in some cases provide greater compression both by reducing R and by reducing the contribution of the overhead to the size of the file. A smaller value of N reduces the time needed to decompress a given compressed block to access a record that may be contained in the block.

In other implementations, different compressed blocks may include different numbers of records. Each block may have a number of records according to a predetermined range. For example, the first block includes records with primary key values 1-1000, and the second block includes records with primary key values 1001-2000, etc. The number of records in the compressed blocks in this example could be different since not every primary key value necessarily exists (e.g., in the case of an existing numerical field used as a natural key).

In some implementations, different compressed blocks may include a target number of records in some cases, and in exceptional cases may include more or fewer records. For example, if a set of records ends with a record whose primary key value is different from the primary key value of the following record in the sorted order, those records are used to generate a compressed block. If the set of records ends with a record whose primary key value is the same as the primary key value of the following record in the sorted order, all the additional records having that primary key value are added to the set. In this way, the same primary key value does not cross over from one compressed block to the next.

The indexing and search module 108 generates an entry in an index file 204 for each of the compressed blocks. The index entries include a key field 206 that identifies each compressed block, for example, by the primary key of the first record in the corresponding uncompressed set of records. The entries also include a location field 208 that identifies the storage location of the identified compressed block within the compressed record file 202. For example, the location field can contain a pointer in the form of an absolute address in the record storage 106, or in the form of an offset from the address of the beginning of the compressed record file 202 in the record storage 106.

To search for a given record in the compressed record file 202, the module 108 can perform a search (e.g., a binary search) of the index file 204 based on the key field 206. For a provided key value (e.g., provided by one of the agents), the module 108 locates a block that includes records corresponding to a range of key values that includes the provided key value. The record with the provided key value may or may not have been included in the set of records used to generate the located block, but if the record existed in the records 200, that record would have been included since the records 200 were sorted by the primary key value. The module 108 then decompresses the located block and searches for a record with the provided key value. In cases in which the primary key value is not unique for each record, the module 108 may find multiple records with the provided key value in the compressed block. In this example in which the key field 206 includes the primary key of the first record in a set, the module 108 searches for two consecutive index entries that have key values earlier and later, respectively, than the provided key value, and returns the block corresponding to the entry with the earlier key value. In some cases, the provided key value may be the same as a key value in an index entry, in which case the module 108 returns the block corresponding to that entry.

In different implementations, there are different ways for the entries in the index file 204 to identify a range of key values corresponding to the records from which a corresponding block was generated. As in the implementation shown in FIG. 2A, the range of key values can be the range between the two extremum key values of the records used to generate a block (e.g., the first and last in a sorted sequence of alphabetical primary key values, or the minimum and maximum in a sorted sequence of numerical primary key values). The index entry can include either or both of the extrema that define the range. In some implementations, if the index entries include the minimum key value that defines a range for a given block, the last index entry associated with the last block in a compressed record file may also include a maximum key value that defines the range for that block. This maximum key value can then be used when searching the compressed record file to determine when a given key value is out of range.

Alternatively, the range of key values can be a range extending beyond the key values of the records used to generate a block. For example, in the case of a block generated from records with numerical primary key values between 1 and 1000, the smallest key value represented in the records may be greater than 1 and the largest key value represented in the records may be smaller than 1000. The index entry can include either or both of the extrema 1 and 1000 that define the range.

When additional records arrive after an initial group of records have been processed to generate a compressed record file, those records can be stored in a buffer and searched in uncompressed form. Alternatively, additional groups of records can be incrementally processed and stored as additional compressed record files accessible by additional index files. In some cases, even when compressing a small number of additional records may not provide a great reduction in storage size, it may still be advantageous to compress the additional records to maintain uniform procedures for accessing records. Additional records can be processed repeatedly at regular intervals of time (e.g., every 30 seconds or every 5 minutes), or after a predetermined number of additional records have been received (e.g., every 1000 records or every 10,000 records). If incoming records are processed based on time intervals, in some intervals there may be no incoming records or a small number of records that are all compressed into a single compressed block.

Figure 2B:
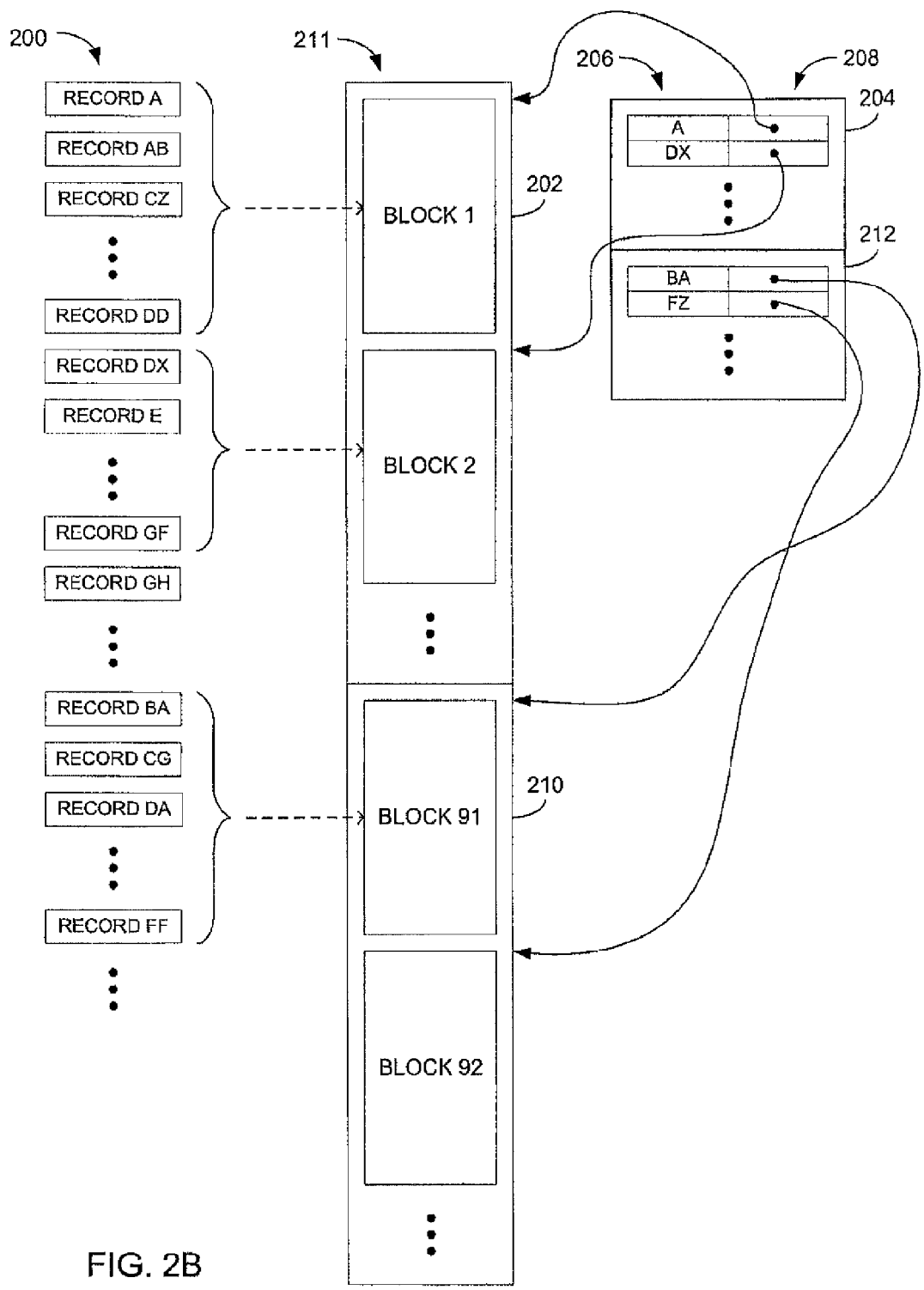

Referring to FIG. 2B, in an example in which additional records have been received by the system 100 after the initial compressed record file 202 has been generated, an additional compressed record file 210 can be appended to the initial compressed record file 202 to form a compound compressed record file 211. The system 100 sorts the additional records by primary key values and compresses sets of N records to generate compressed blocks of the compressed record file 210. The first compressed block in the appended file 210 labeled BLOCK 91 has primary key values BA-FF. The module 108 generates an additional index file 212 that includes entries that can be used to search for the additional records represented within the appended file 210. The new index file 212 can be appended to the previous index file 204.

Any number of compressed record files can be appended to form a compound compressed record file. If the indexing and search module 108 is searching for a record with a given key value within a compound compressed record file, the module 108 searches for the record within each of the appended compressed record files using the corresponding index files. Alternatively, an agent requesting a given record can specify some number of the compressed record files with a compound compressed record file to be searched (e.g., the 10 most recently generated, or any generated within the last hour).

After a given amount of time (e.g., every 24 hours) or after a given number of compressed record files have been appended, the system 100 can consolidate the files to generate a single compressed record file from a compound compressed record file and a new corresponding index file. After consolidation, a single index can be searched to locate a compressed block that may contain a given record, resulting in more efficient record access. At consolidation time, the system 100 decompresses the compressed record files to recover the corresponding sets of sorted records, sorts the records by primary key values, and generates a new compressed record file and index. Since each of the recovered sets of records is already sorted, the records can be sorted efficiently by merging the previously sorted lists according to the primary key values to generate a single set of sorted records.

Figure 2C:
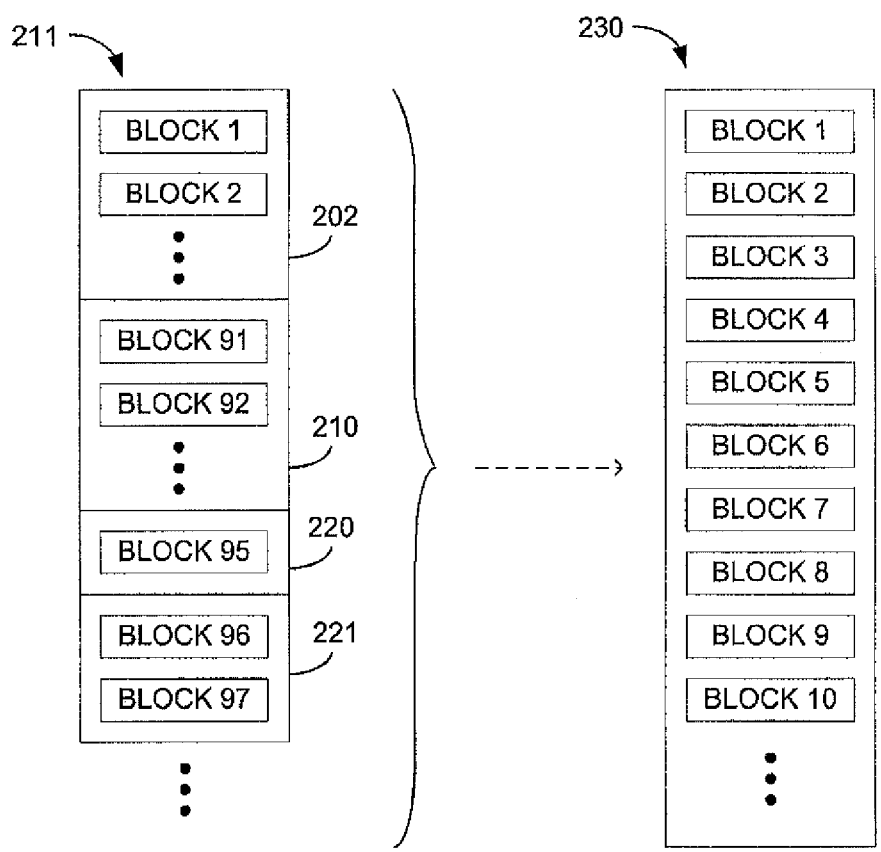

Referring to FIG. 2C, the compound compressed record file 211 includes the initial compressed record file 202, the additional compressed record file 210, and number of additional compressed record files 220, 221, . . . depending on how many additional records have arrived and how often the records have been processed. Each compressed record file can have an associated index file that can be used to search for a given record in within the compressed blocks of that file. In this example, one of the compressed record files 220 is small enough to have only a single compressed block (BLOCK 95), and therefore does not necessarily need an associated index file, but can have associated data that indicates a range of primary key values in the block and its location in storage. After consolidation, the records recovered from the different appended compressed record files are processed to generate a single compressed record file 230.

Figure 2D:
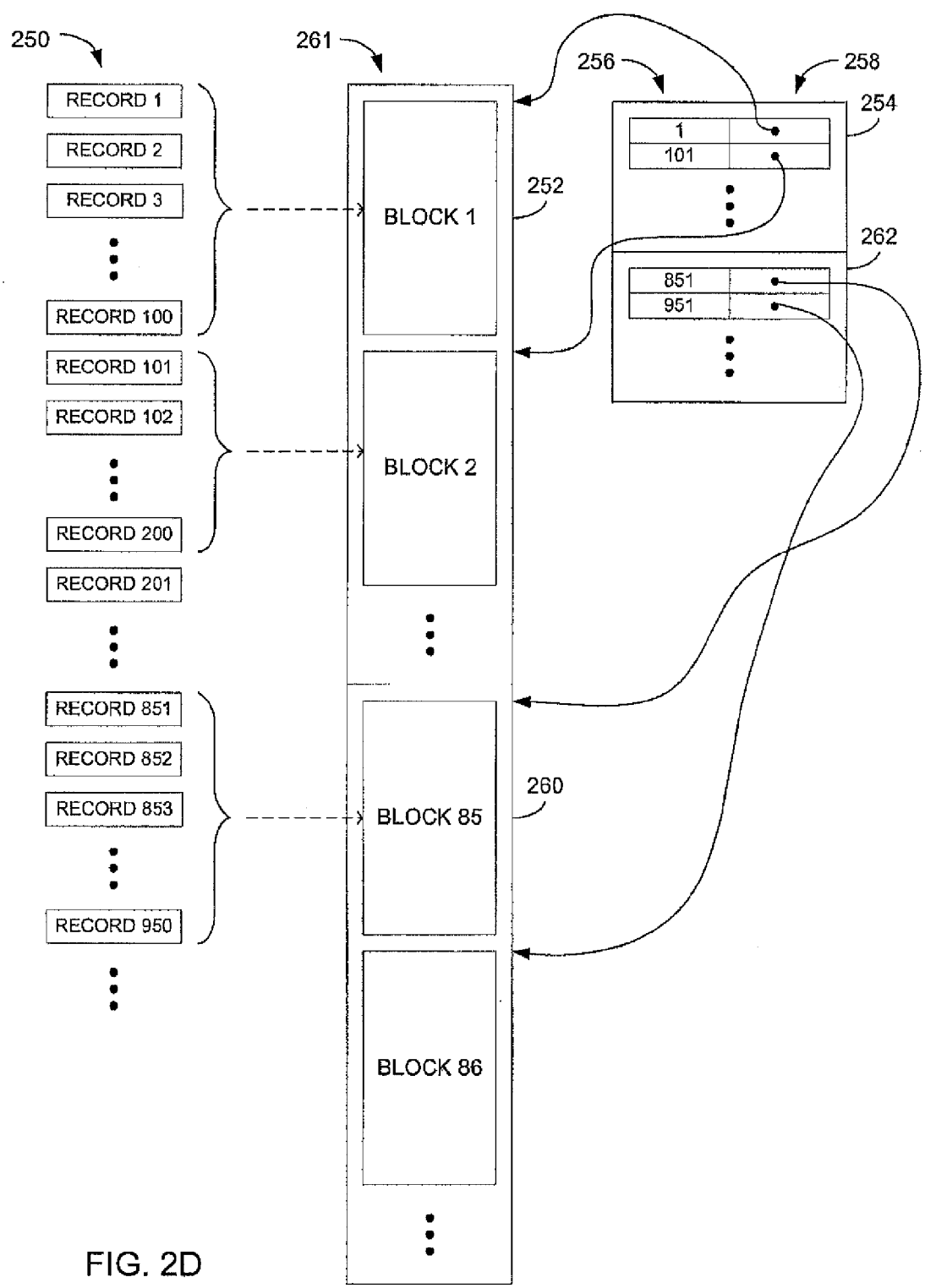

In the case of monotonically assigned primary keys, records are automatically sorted not only within compressed record files, but also from one file to the next, obviating the need to consolidate files in order to access a record in a single index search. Referring to FIG. 2D, the system 100 receives a set of records 250 that are identified by consecutive integers assigned in arrival order as primary keys for the records. Thus, the records 250 are automatically sorted by primary key. An initial compressed record file 252 includes compressed blocks each including 100 records in this example, and an index file 254 includes a key field 256 for the primary key value of the first record in a compressed block and a location field 258 that identifies the corresponding storage location. Since records that arrive after the initial compressed record file 252 has been generated will automatically have primary key values later in the sorted order, an appended compressed record file 260 and corresponding index file 262 do not need to be consolidated to enable efficient record access based on a single index search. For example, the index file 262 can simply be appended to the index file 254 and both indices can be searched together (e.g., in a single binary search) for locating a compressed block in either of the compressed record files 252 or 260.

The compound compressed record file 261 may optionally be consolidated to eliminate an incomplete block that may have been inserted at the end of the compressed record file 252. In such a consolidation, only the last compressed block in the first file 252 would need to be decompressed, and instead of merging the decompressed sets of records, the sets of records could simply be concatenated to form a new sorted set of records to be divided into sets of 100 records that are then compressed again to form a new compressed record file.

Another advantage of using a consecutive integer synthetic primary key values is that if the records are going to be partitioned based on the primary key value, the partitions can be automatically balanced since there are no gaps in the key values.

Any of a variety of techniques can be used to update records and invalidate any previous versions of the record that may exist in a compressed record file. In some cases, records don't need to be removed or updated individually (e.g., logs, transactions, telephone calls). In these cases, old records be removed and discarded or archived in groups of a predetermined number of compressed blocks, for example, from the beginning of a compressed record file. In some cases, entire compressed record files can be removed.

In some cases, one or more values of a record are updated by adding a new updated record for storage in a compressed block, and a previously received version of the record (with the same primary key value) may be left stored in a different compressed block. There could then multiple versions of a record and some technique is used to determine which is the valid version of the record. For example, the last version (most recently received) appearing in any compressed record file may be implicitly or explicitly indicated as the valid version, and any other versions are invalid. A search for a record with a given primary key in this case can include finding the last record identified by that primary key in order of appearance. Alternatively, a record can be invalidated without necessarily adding a new version of a record by writing an "invalidate record" that indicates that any previous versions of the record are not valid.

The system 100 mediates access to the compressed record files stored in the record storage 106 by different processes. Any of a variety of synchronization techniques can be used to mediate access to the compressed blocks within one or more compressed record files. The system 100 ensures that any processes that modify the files (e.g., by appending or consolidating data) do not interfere with one another. For example, if new records arrive while consolidation is occurring, the system 100 can wait until the consolidation process is finished, or can generate compressed blocks and store them temporarily before appending them to existing compressed record files. Processes that read from a compressed record file can load a portion of the file that is complete, and can ignore any incomplete portion that may be undergoing modification.

The system 100 stores additional data that enables a search for record based on an attribute of the record other than the primary key. A secondary index for a compressed record file includes information that provides one or more primary key values based on a value of an attribute that is designated as a secondary key. Each attribute designated as a secondary key can be associated with a corresponding secondary index. For example, each secondary index can be organized as a table that has rows sorted by the associated secondary key. Each row includes a secondary key value and one or more primary key values of records that include that secondary key value. Thus, if an agent initiates a search for any records that include a given secondary key value, the system 100 looks up the primary key(s) to use for searching the index of the compressed record file for the compressed block(s) that include the record(s). The secondary index may be large (e.g., on the order of the number of records) and in some cases may be stored in the storage medium that stores the compressed record files.

In some cases, the values of an attribute designated as a secondary key may be unique for each record. In such cases, there is a one-to-one correspondence between that secondary key and the primary key, and the interface module 112 can present that secondary key attribute as though it were the primary key to an agent.

Each secondary index can be updated as new compressed record files are appended to a compound compressed record file. Alternatively, a secondary key can be associated with a different secondary index for each compressed record file, and the secondary indices can be consolidated into a single secondary index when the compressed record files are consolidated.

A screening data structure can be associated with a compressed record file for determining the possibility that a record that includes a given attribute value is included in a compressed block of the file. For example, using an overlap encoded signature (OES) as a screening data structure enables the system 100 to determine that a record with a given key value (primary key or secondary key) is definitely not present (a "negative" result), or whether a record with the given key value has the possibility of being present (a "positive" result). For a positive result, the system accesses the appropriate compressed block to either retrieve the record (a "confirmed positive" result), or determine that the record is not present (a "false positive" result). For a negative result, the system can give a negative result to an agent without needing to spend time decompressing and searching the compressed block for a record that is not present. The size of the OES affects how often positive results are false positives, with larger OES size yielding fewer false positive results in general. For a given OES size, fewer distinct possible key values yields fewer false positives in general.

Other types of screening data structures are possible. A screening data structure for a given primary or secondary key can be provided for each compressed record file. Alternatively, a screening data structure for a key can be provided for each compressed block.

FIGS. 3A and 3B show tables that provide probability values for obtaining a false positive result for a key value for various sizes of an exemplary OES screening data structure (columns) and various numbers of distinct key values represented in the compressed record file (rows). For an OES, depending on the size of the OES and the number of distinct key values, the presence of more than one key value may be indicated in the same portion of the OES, potentially leading to a false positive result for one of those key values if the other is present. The size of this exemplary OES varies from $2^{10}$=1024 bits (in the table of FIG. 3A) to $2^{28}$=256 Mbits (in the table of FIG. 3B). The number of distinct key values varies from 100 (in the table of FIG. 3A) to 100,000,000 (in the table of FIG. 3B). For both tables, the blank cells in the upper right correspond to 0% and the blank cells in the lower left correspond to 100%. For the cells in which the false positive probability is low (e.g., near zero), the screening data structure may be larger than necessary to provide adequate screening. For the cells in which the false positive probability is significant (e.g., >50%), the screening data structure may be too small to provide adequate screening. This example corresponds to a technique for generating an OES using four hash codes per key value. Other examples of OES screening data structures could yield a different table of false positive probabilities for given numbers of distinct keys.

Since the number of distinct key values represented in a compressed record file may not be known, the system 100 can select the size of the screening data structure for the compressed record file based on the number of records from which the file was generated. In selecting the size, there is a trade-off between reducing false positive probabilities and memory space needed to store the screening data structure. One factor in this trade-off the likelihood of searching for absent key values. If most of the key values to be looked up are likely to be present in the decompressed records, the screening data structures may not be needed at all. If there is a significant probability that key values will not be found, then allocating storage space for relatively large screening data structures may save considerable time.

The size of a screening data structures associated with a compressed record file may depend on whether the file corresponds to an initial or consolidated large database of records, or a smaller update to a larger database. A relatively smaller screening data structure size can be used for compressed record files that are appended during regular update intervals since there are generally fewer distinct key values in each update. Also, the small size can reduce the storage space needed as the number of compressed record files grows after many updates. The size of the screening data structure can be based on the expected number of records and/or distinct key values in an update, and on the expected number of updates. For example, if updated files are appended every five minutes through a 24-hour period, there will be 288 compressed record files at the end of the day. The probability of at least one false positive result will be 288 times the appropriate value from the tables of FIGS. 3A and 3B (assuming the results for different updates are independent). After consolidation, a larger screening data structure may be appropriate for the consolidated compressed record file since the number of distinct key values may increase significantly.

A compressed record file can have a screening data structure for the primary key and for each secondary key, or for some subset of the keys. For example, the system 100 may provide a screening data structure for the primary key, and for only those secondary keys that are expected to be used most often in searching for records.

Figure 4A:
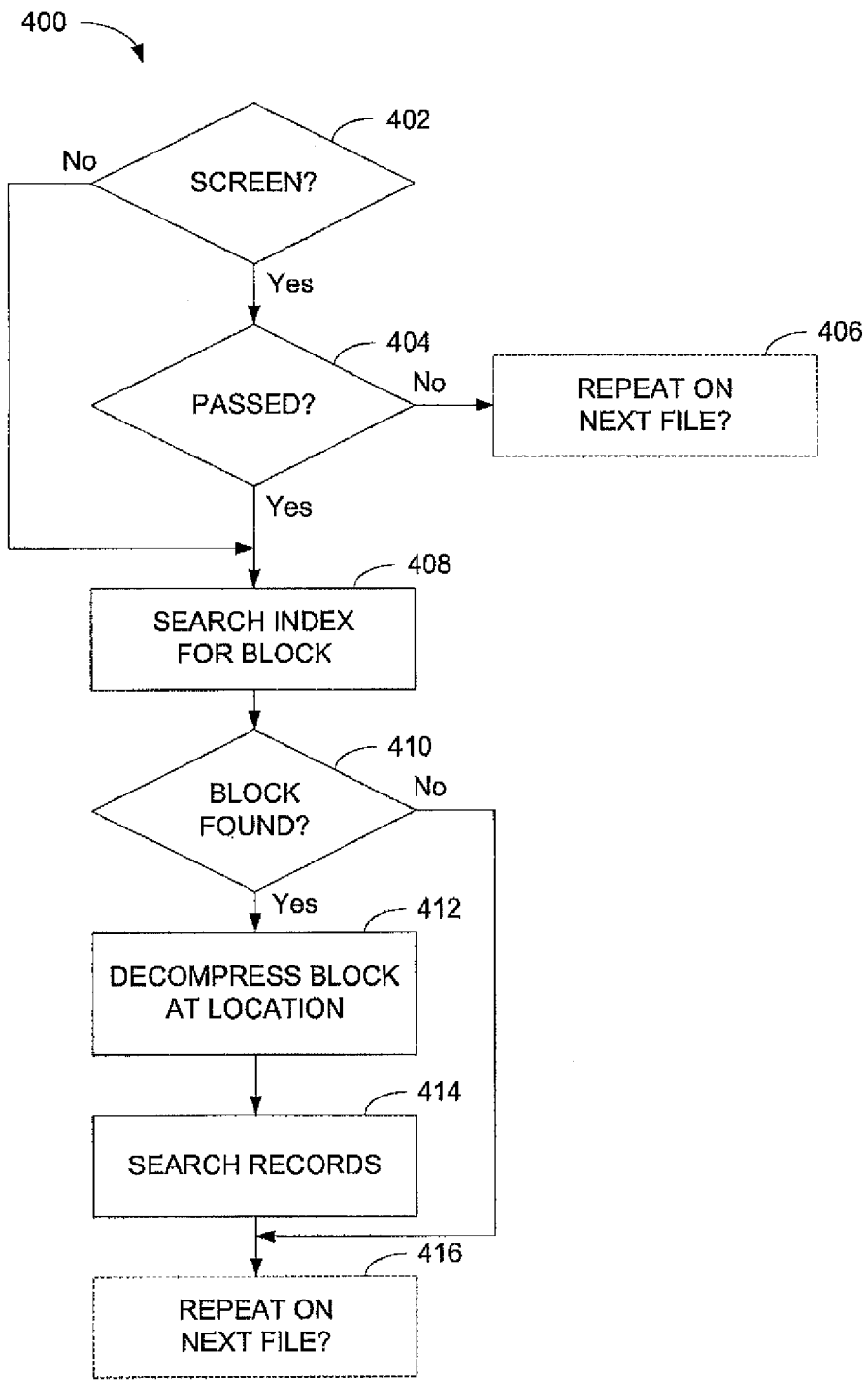
FIGS. 4A and 4B are flowcharts of procedures for searching for records.

FIG. 4A shows a flowchart for a procedure 400 for searching for one or more records with a given primary key value. The procedure 400 determines 402 whether there is a screening data structure associated with a first compressed record file. If so, the procedure 400 processes 404 the screening data structure to obtain either a positive or negative result. If the given primary key value does not pass the screening (a negative result), then the procedure 400 checks 406 for a next compressed record file and repeats on that file if it exists. If the given primary key value does pass the screening (a positive result), then the procedure 400 searches 408 the index for a block that may contain a record with the given primary key value. If no screening data structure is associated with the compressed record file, then the procedure 400 searches 408 the index without performing a screening.

After searching 408 the index, if a compressed block associated with a range of key values that includes the given primary key value is found 410, then the procedure 400 decompresses 412 the block at the location identified by the index entry and searches 414 the resulting records for one or more records with the given primary key value. The procedure then checks 416 for a next compressed record file and repeats on that file if it exists. If no compressed block is found (e.g., if the given primary key value is smaller than the minimum key value in the first block or greater than the maximum key value in the last block), then the procedure 400 checks 416 for a next compressed record file and repeats on that file if it exists.

Figure 4B:
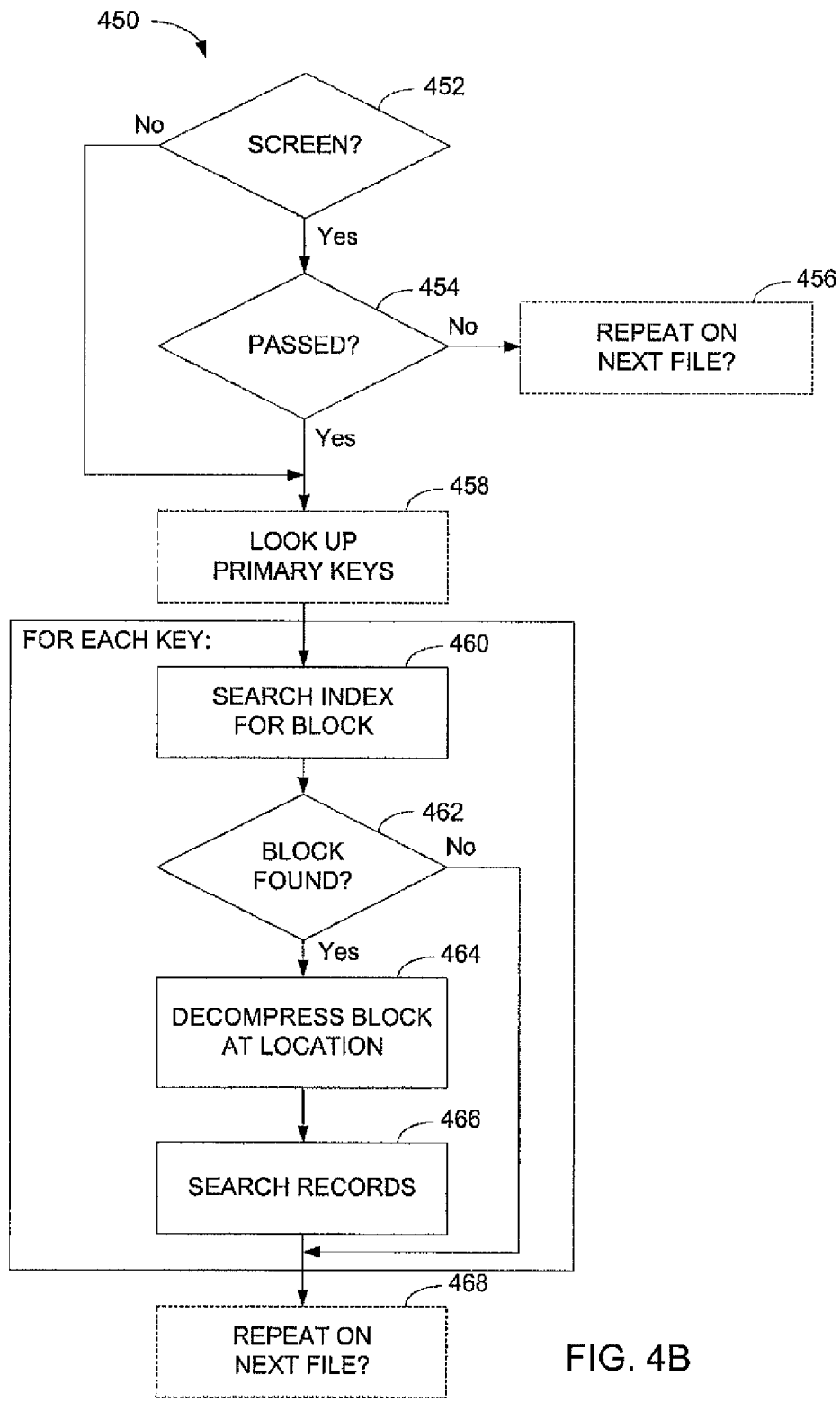

FIG. 4B shows a flowchart for a procedure 450 for searching for one or more records with a given secondary key value. The procedure 450 determines 452 whether there is a screening data structure associated with a first compressed record file. If so, the procedure 450 processes 454 the screening data structure to obtain either a positive or negative result. If the given secondary key value does not pass the screening (a negative result), then the procedure 450 checks 456 for a next compressed record file and repeats on that file if it exists. If the given secondary key value does pass the screening (a positive result), then the procedure 450 looks up 458 the primary keys that correspond to records containing the given secondary key. If no screening data structure is associated with the compressed record file, then the procedure 450 looks up 458 the primary keys without performing a screening.

For each of the primary keys found, the procedure 450 searches 460 the index for a block that may contain a record with the given primary key value. After searching 460 the index, if a compressed block associated with a range of key values that includes the given primary key value is found 462, then the procedure 450 decompresses 464 the block at the location identified by the index entry and searches 466 the resulting records for one or more records with the given primary key value. The procedure then checks 468 for a next compressed record file and repeats on that file if it exists. If no compressed block is found, then the procedure 450 checks 468 for a next compressed record file and repeats on that file if it exists.

Multiple records found with a given primary or secondary key can be returned by procedure 400 or procedure 450 in order of appearance, or in some cases, only the last version of the record is returned.

The file management module 104 also manages storage and access of records using appendable lookup files. In one example of using appendable lookup files, the system 100 manages a large primary data set (e.g., encompassing hundreds of terabytes of primary data). This primary data set will generally be stored in one or a series of multiple compressed record files (possibly concatenated into a compound compressed record file). However, if the data needs to be visible shortly after it arrives (e.g., within a minute or less) then it may be useful to supplement the compressed record file with an appendable lookup file. The appendable lookup file is able to reduce the latency between the time when new data arrives and the time when that data becomes available to various query processes. The new data could result, for example, from another process actively writing data to the file. The system 100 is able to manage access to partial appendable lookup files that may be incomplete. In some systems, if a query process encountered a partial file, a program error would result. To avoid this program error, some of these systems would reload an index associated with the file every time the file was queried. Reloading the index on every query can be inefficient in some situations, and may consume an appreciable amount of system resources.

Generally, appendable lookup files are uncompressed data files which are tolerant of partial records added at the end of the file. An appendable lookup file is able to recognize incomplete records, and is able to process query requests even when the file queried contains incomplete records. An appendable lookup file does not have the type of index file as described above for the compressed record files; rather, an appendable lookup file has a "dynamic index" that maps each record's location in a data structure stored in a relatively fast working memory (e.g., a volatile storage medium such as a Dynamic Random Access Memory). For example, these dynamic indexes could be hash tables, binary trees, b-trees, or another type of associative data structure.

Figure 5:
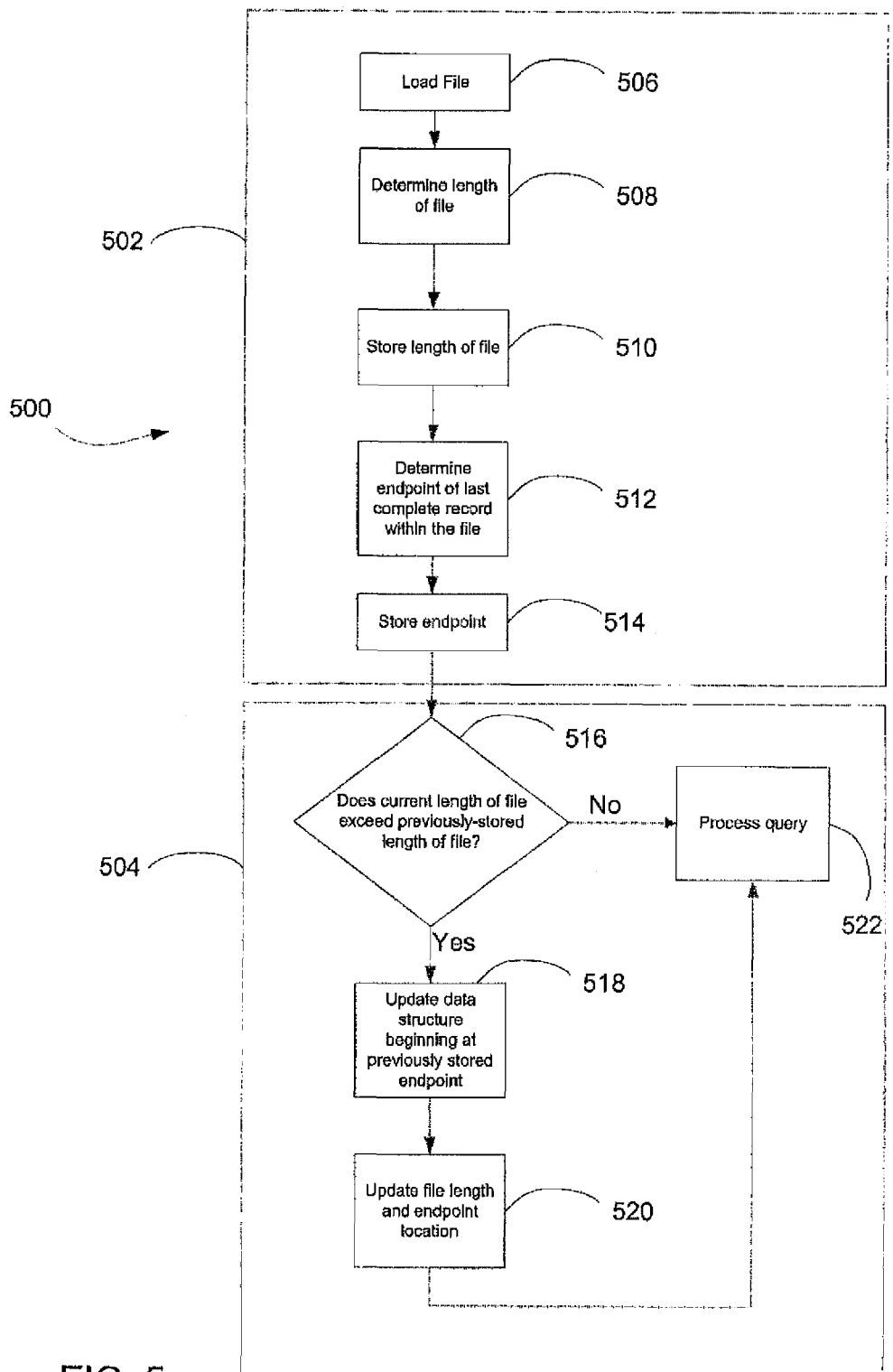
FIG. 5 is a flowchart of the procedure for querying records.
Figure 6A:
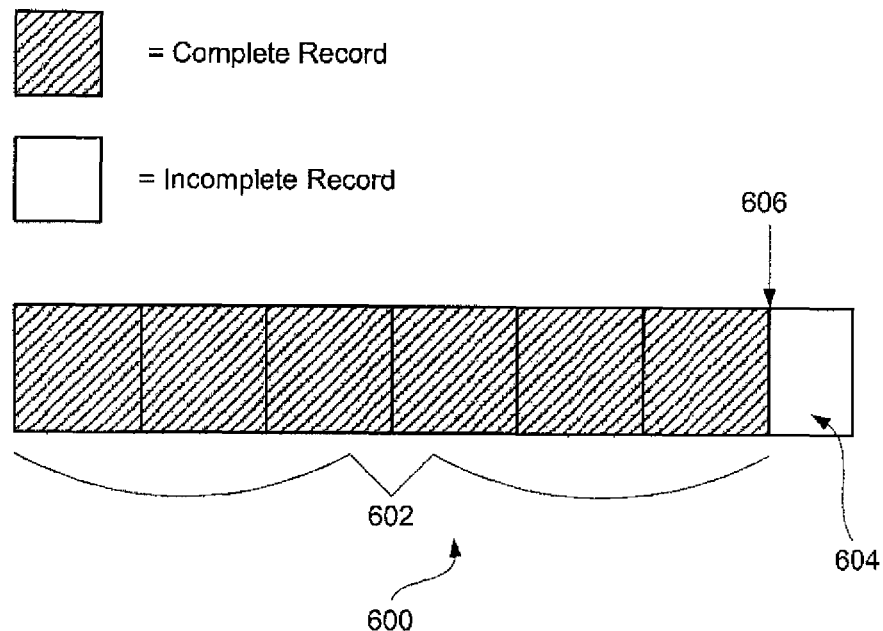
FIGS. 6A and 6B are schematic diagrams of appendable lookup files.
Figure 6B:
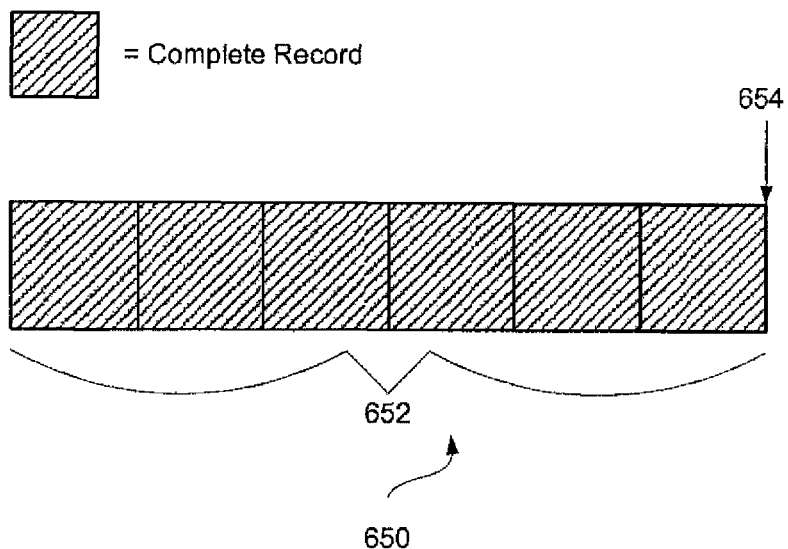

FIGS. 5, and 6A-6B show examples of managing records using appendable lookup files. FIG. 5 is an example of the process by which an appendable lookup file is queried. The process flow 500 related to the operation of an appendable lookup file includes a load process 502 and a query process 504. After the file is loaded 506 (such as when the file is queried), the length of the file is determined 508. After the length of the file has been determined 508, the determined length is stored 510 in a memory location, such as in the working memory.

The system then determines 512 an "endpoint," which is a location representing the end of the last complete record within the file. In some cases, such as when no new data is being written to the file, the endpoint would simply represent the end of the file. The endpoint could also represent a location that immediately precedes the first segment of new data (see FIG. 6). After the endpoint has been determined 512, it is stored 514 in a memory location, such as in main memory.

During the query process 504, the system 100 decides whether to process the query 522, or to update 518 the associative data structure associated with the queried file. To make this determination the system compares 516 the current length of the file to the length of the file that was previously determined and stored in memory. This determination can be made in a number of ways. For example, the system can examine the file metadata, file headers, or can search the file for new line characters. If the length of the file does not exceed the previously-stored file length, then no new data has been added to the end of the data file, and the query is processed 522. If the current length of the file exceeds the previously-stored length of the file, the associative data structure is updated 518, beginning at the previously-stored endpoint. In this manner, the associative data structure can be updated without having to reload or rebuild it entirely. Instead, the data that is already loaded in memory remains loaded, and new data is appended beginning at the previously-stored endpoint. Before processing the query, the file length and the endpoint are also updated 520. Other steps such as error checking can be performed in this process. For example, if the system determines that the current length of the file is smaller than the previously-stored length of the file, an error can be flagged.

FIGS. 6A and 6B are examples of the location of endpoints within a file, as determined by step 512 in FIG. 5. In FIG. 6a, appendable lookup file 600 includes complete records 602 and incomplete record 604. In this case, the endpoint 606 is a location representing the end of the last complete record within appendable lookup file 600, and immediately precedes the beginning of incomplete record 604.

In the example of FIG. 6B, appendable lookup file 650 is comprised of entirely complete records 652. In this case, endpoint 654 again represents the end of the last complete record within appendable lookup file 650; however, endpoint 654 also represents the end of the file.

Data may be continuously appended to the appendable lookup files which, in turn, are continuously updated. As a result, the appendable lookup files become increasingly large in size, and the time it takes to load an appendable lookup file increases correspondingly. Appendable lookup files may be combined with other forms of dynamically loadable index files to avoid the appendable lookup files becoming too large to load in a desirable amount of time.

In some applications, a continuous stream of data to be loaded into a queriable data structure may be arriving at a high rate of speed, and access to the data soon after it has arrived may be desired. When the data arrives, it is handled by a dual process. First, the data is replicated, and is simultaneously added to both an appendable lookup file (so that it is immediately visible to and accessible by the file system) and to a second file or "buffer." The data continues to accumulate in both the appendable lookup file and the buffer until a predefined condition is satisfied. The predefined condition may be a number of criteria. For example, the predefined criteria may be a length of time, a file size, an amount of data, or a number of records within the data.

After the predefined condition is satisfied, the block of data that has accumulated in the buffer is added to a compressed record file for longer term storage. After the data is added to the compressed record file, a new appendable lookup file is created and begins to collect data from the data stream. The old appendable lookup file is finalized, and is deleted after the compressed record file contains all of the corresponding data.

While the data is being received by both the buffer and the appendable lookup file, the data in the buffer can be sorted. Because sorting the data consumes a substantial amount of time and system resources, it is advantageous to begin the sorting process as early as possible to allow the data to be transferred to the compressed record file more quickly.

Alternatively, the appendable lookup file can be used as a buffer. In this embodiment, data is accumulated in the appendable lookup file until the predefined condition is satisfied. The contents of the appendable lookup file are then added to the compressed record file while, simultaneously, the old appendable lookup file is finalized and a new appendable lookup file is created and begins to collect data from the data stream. Again, the old appendable lookup file is deleted after the compressed record file contains all of the corresponding data.

During each cycle of this process, it would be desirable to simultaneously add data to the compressed record files and delete all the data in the appendable lookup files. However, because the two updates may cause race conditions, there could be a significant window in which the old appendable lookup file had been deleted but the compressed record file had not yet been updated with its data. This would result in a temporary loss of data. In order to prevent this, the old appendable lookup file can be kept for an additional cycle of this process. The indexing and search module 108 is configured to detect conditions in which duplicate data may exist in both the appendable lookup file and the compressed record file, and the indexing and search module 108 filters out duplicate data if a query is made during this condition.

Alternatively, the file management module 104 may maintain status information in, for example, a status information file 107 to coordinate the retirement of an appendable lookup file after either the data buffer has been written to the compressed lookup file or the contents of the appendable lookup file have been added to the compressed lookup file. The status information file 107 identifies the currently active record related data structures. For example, the status information file 107 identifies all of the compressed data files and the number of blocks they contain along with the all of the appendable lookup files that are currently active. The indexing and search module 108 will disregard any appendable lookup files, compressed data files, and blocks within compressed data files that do not appear in the status information file. When a new appendable lookup file is created, the following is an example of a protocol that is observed by the file management module 104: the file management module 104 adds new data to the compressed data file and creates a new appendable lookup file; the file management module 104 locks the status information file to prevent it from being accessed by the indexing and search module 108; the file management module updates the status information file to reflect the addition of new data to the compressed data file, the removal of the old appendable lookup file, and the creation of the new appendable lookup file; the file management module unlocks the status information file, allowing it to once again be accessed by the indexing and search module 108; the file management module 104 removes the old appendable lookup file.

The indexing and search module 108 follows the following exemplary protocol: it locks the status information file to prevent the file management module 104 from updating it; it performs the query in accordance with the appendable lookup files and compressed data files identified in the status information file; it unlocks the status information file to once more permit the file management module 104 to update the status information file.

The status information file 107 may be stored either on disk or in memory. This protocol ensures that the search module will either see the old appendable lookup file and the compressed data file prior to the incorporation of data from the old appendable lookup file, or the new appendable lookup file and the updated compressed data file.

When a query is made when both the new appendable lookup file and the old appendable lookup file exist at the same time, in one implementation, the system looks in a directory to see which appendable lookup file is currently active (e.g., either the new appendable lookup file or the old appendable lookup file may be active since the new appendable lookup file may not become active until some amount of delay after it has been created). Alternatively, when the system processes queries, it first looks in the newest appendable lookup file, then in the old appendable lookup file. If the queried data is still not located, the system looks in the compressed record file.

Figure 7:
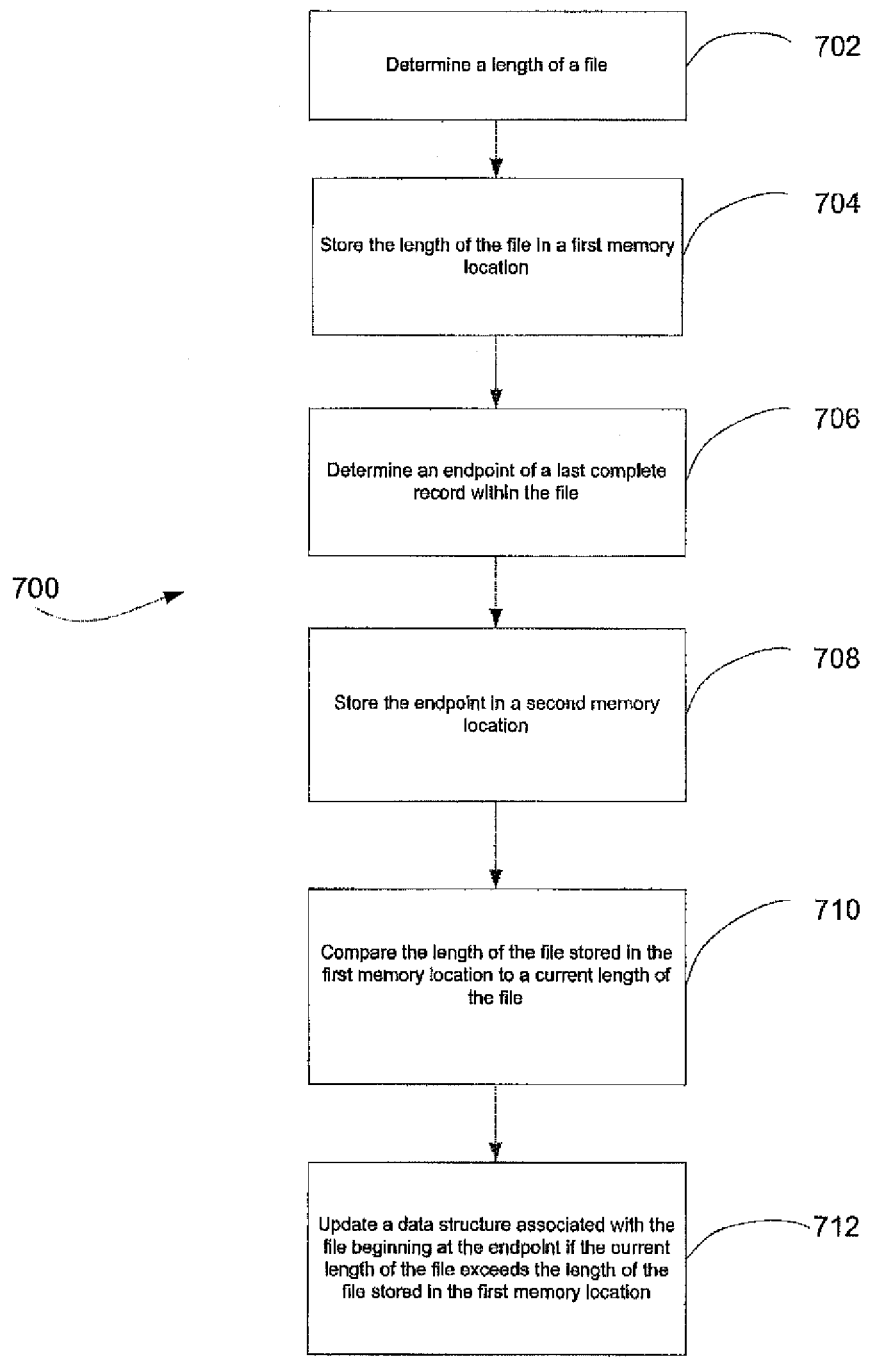
FIG. 7 is a flowchart of a procedure for querying an appendable lookup file.

In FIG. 7, a procedure 700 performed by system 100 determines a length of a file 702 and stores the length of the file in a first memory location 704. The procedure 700 determines an endpoint of a last complete record within the file 706 and stores the endpoint in a second memory location 708. The procedure compares the length of the file stored in the first memory location to a current length of the file 710 and updates a data structure associated with the file beginning at the endpoint if the current length of the file exceeds the length of the file stored in the first memory location 712.

Figure 8:
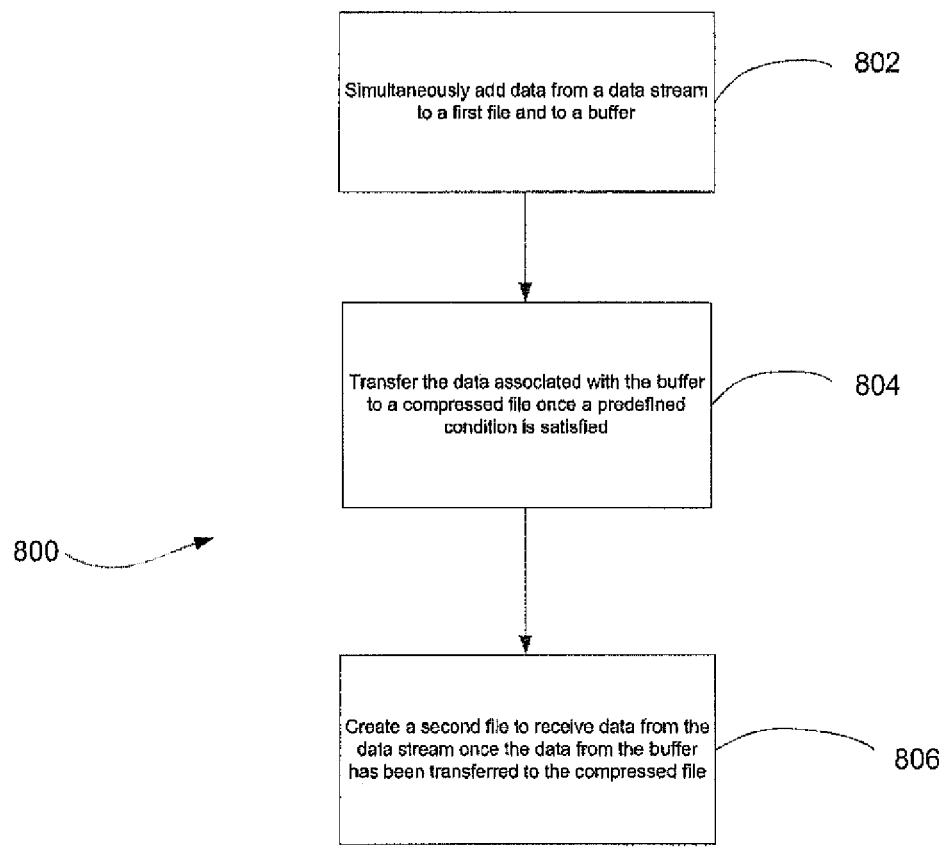
FIG. 8 is a flowchart of a procedure for storing data.

In FIG. 8, a procedure 800 performed by system 100 simultaneously adds data from a data stream to a first file and to a buffer 802, and transfers the data associated with the buffer to a compressed file after a predefined condition is satisfied 804. The procedure 800 creates a second file to receive data from the data stream after the data from the buffer has been transferred to the compressed file 806.

Figure 9:
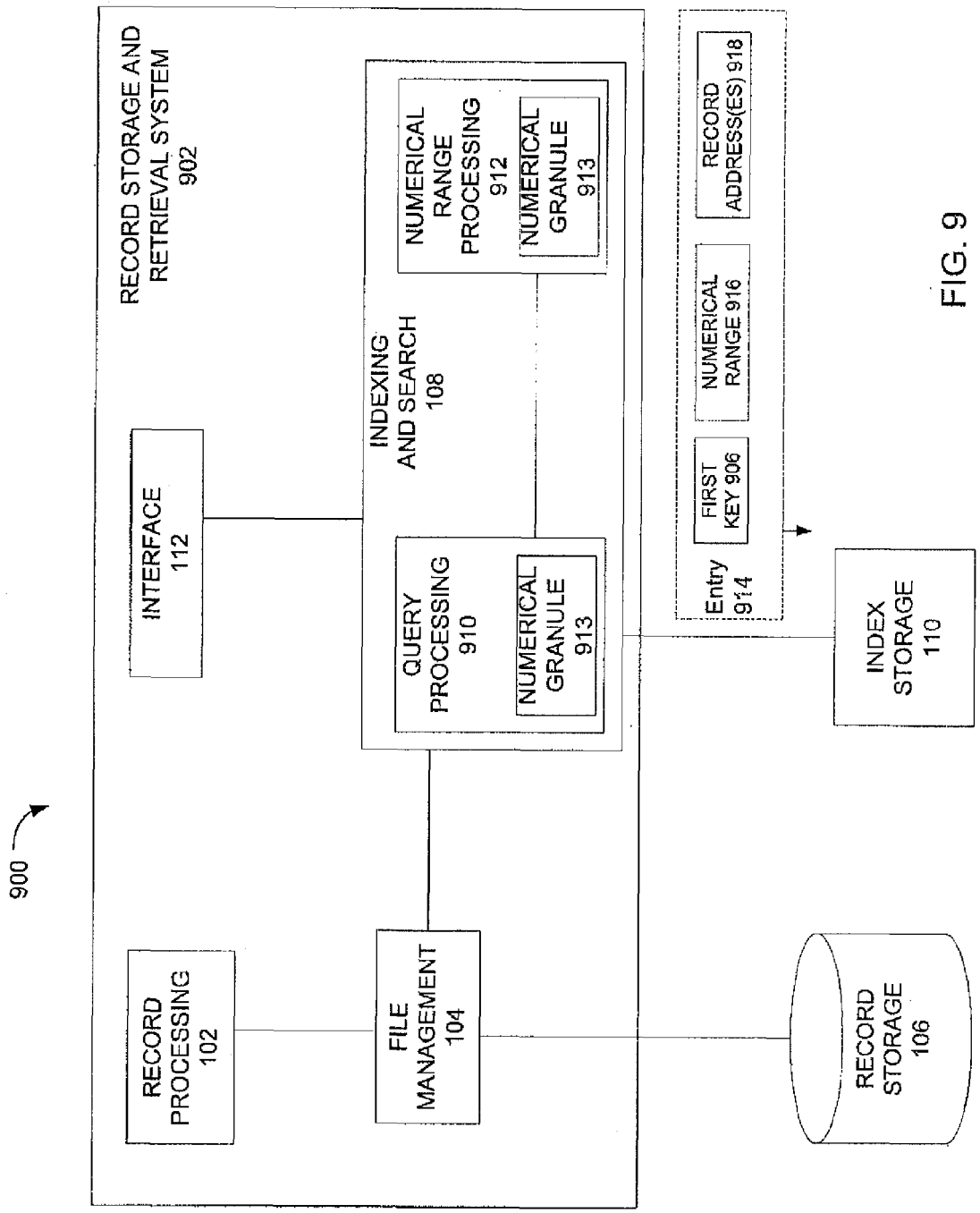
FIG. 9 is a block diagram of a system for storing and retrieving records.

FIG. 9 shows a system 900 that includes a record storage and retrieval system 902 that includes an interface 112, a record processing module 102, a file management module 104, a record storage module 106, an indexing and search module 108, and an index storage module 110. In some examples, the record storage module 106 stores a number of records using one or more compression techniques, such as those described above. For example, records can be grouped according to a numerical attribute of the records (e.g., records that are associated with the same date of occurrence based on a time stamp associated with each of the records). As described above, each group of records may be associated with both one or more data files that store the records (e.g., as compressed records) and an index that stores both the location of each record within the data file(s) and one or more index keys that may correspond to attributes of the records (e.g., attributes that represent primary or secondary keys for the records). For a given group of records, the data file(s) and one or more indexes associated with that data file(s) may be stored separately. For example, the one or more indexes may be stored in the index storage module 110, and the data file(s) may be stored in the record storage module 106.

A query processing engine 910 in the indexing and search module 108 is configured to process search queries (e.g., queries received from a user via the interface 112). In some examples, in order to retrieve one or more records specified in a query received by the query processing engine 910, any data file that might possibly include records that satisfy the query could be decompressed, have its records loaded into memory, and have its records matched against the specifications of the query. The matching records may be identified for further processing or output (e.g., to the interface 112), while the records that do not match the specifications of the query may be simply removed from memory. Using the example above, if compressed records are stored in data files that correspond to a specific date of occurrence, the record storage and retrieval system 902 may receive a query that requests the retrieval of all records associated with one hour of a single date (e.g., all records associated with a time of 1:00 AM to 2:00 AM on Jun. 1, 2011). In this simplified example, only the data file associated with the date of Jun. 1, 2011 would be searched; however, after that entire data file had been decompressed, loaded into memory, and matched against the query specifications of the time period between 1:00 AM and 2:00 AM, many records within the data file may be determined not to match this constraint. As a result, decompressing, loading, and searching the non-matching records could be viewed as wasteful operations. Using the same example data file structure, the problem can be compounded if, for example, a query requests the retrieval of all records associated with the same time period for an entire year, as 365 data files would be decompressed, loaded, and searched, even though only records within a single hour of each day are relevant to the query terms.

In some examples, the system 900 may allow records stored within the record storage module 106 to be located, identified, and retrieved with greater precision than the techniques described above. For example, the indexing and search module 108 may construct an index that includes (or update an existing index to include) entries that include an association with a numerical range (e.g., a period of time) that is coarser in scope than numerical attributes associated with a given record, but finer in scope than a span of numerical attribute values associated with an entire data file. Referring again to the examples above, records may each include a time stamp. For example, if the records represent incoming telephone calls, the records may include a time stamp that indicate when the call was received, as well as what phone number was called, what phone number placed the call, and other information. In some examples, the time stamp may be in the form of hours, minutes, and second (e.g., in the format HH:MM:SS). Thus, a given data file may include records associated with time stamps that fall within a single date (e.g., Jun. 1, 2011), and an index associated with that data file may include entries that provide the location of each of those records within the data file, as well as one or more attributes of the record (e.g., the phone number called). The entries in the index may each also include information that describes a numerical range (sometimes referred to as a "time quantum" when the numerical attribute is time) within which the time stamp of a corresponding record falls.

In order to calculate a numerical range for a record that includes, for example, a time stamp, a numerical range processing module 912 associated with the indexing and search module 108 may process a time stamp to provide a numerical range. The numerical range is based in part on a numerical granule 913 that specifies the size of the desired numerical range (e.g., time duration when the numerical attribute is time). For example, the numerical granule 913 may specify that the numerical ranges provided for each time stamp will encompass ten minutes of a single day. For example, if a record includes a time stamp of 1:00:00 AM and the numerical granule 913 specifies a value of 10 minutes (600 seconds), the numerical range can be computed. In some examples, the time stamp (1:00:00 AM) can be converted to different units as part of the calculation. For example, 1:00:00 AM on a particular day can be represented by a number of time units that have passed since midnight on the previous day (e.g., 1 hour or 3600 seconds).

In some examples, the numerical range can be calculated by converting the time stamp to the same time unit associated with the time granule (e.g., seconds). The numerical range can then be determined, for example, by dividing the converted time stamp (3600 seconds) by the time granule (600 seconds), as follows:

$$NumericalRange = \frac{ConvertedTimeStamp}{TimeGranule} = \frac{3600 \text{ sec}}{600 \text{ sec}} = 6$$

Accordingly, for the above example, the numerical key processing module 912 may determine, based on the numerical granule 913, a numerical range for association with a record having a 1:00:00 AM time stamp. In some examples, the numerical key processing module 912 uses only the quotient resulting from the division and may round off or drop a remainder from a numerical range calculation that does not resolve to an integer value.

After the numerical range has been calculated by the numerical key processing module 912 for a given record, the indexing and search module 108 can provide an entry (or an update to an entry) 914 to the index storage 110 that includes the numerical range 916. The index storage 110 may then store the entry 914 in one or more indexes associated with the data files that store the records represented by the one or more record addresses 918. The entry 914 may also include a first key 906 (e.g., if the entry is a new entry) as well as the one or more record addresses 918. In some examples, the one or more record addresses 918 identify one or more locations (e.g., within a data file stored, for example, in the record storage module 106) that contains records that are associated with the first key 906 and the numerical range 916.

As mentioned above, the entry 914 may include one or more record addresses 918. For example, if three records (each being uniquely stored in a data file) are associated with the first key 906 (e.g., a common phone number) as well as the numerical range 916 (e.g., numerical range 6, as calculated above), the record addresses 918 (which may be pointers, for example) can be aggregated and stored together in the entry 914. Storing multiple record addresses together in a single entry, such as the entry 914, can preserve storage space by allowing an index to store fewer entries.

Figure 10:
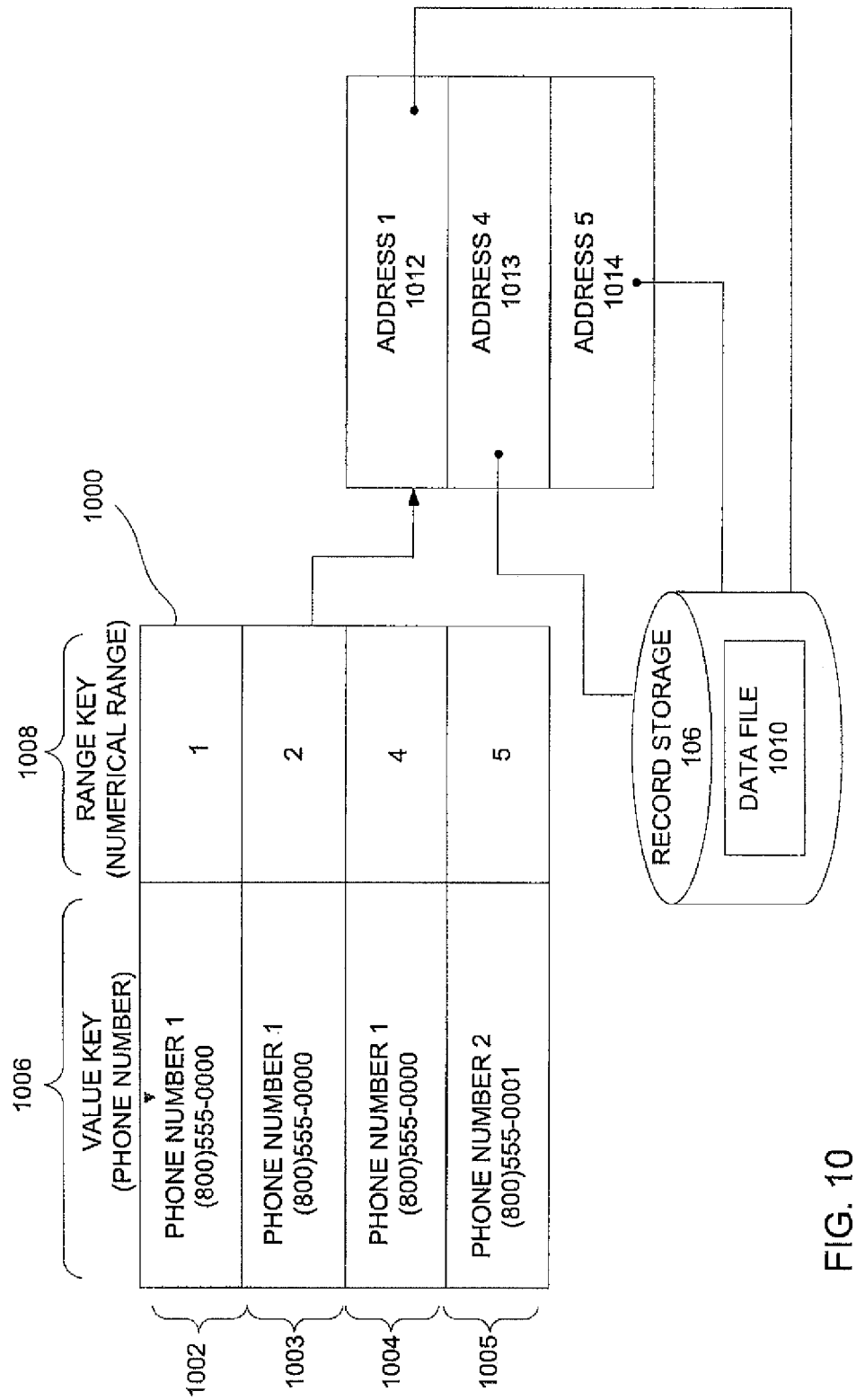
FIG. 10 is a diagram of an example index.

FIG. 10 shows an example index 1000 that includes four entries: a first entry 1002, a second entry 1003, a third entry 1004, and a fourth entry 1005. Each of the entries 1002-1005 includes a first key (called a "value key") represented by a first column 1006 and a second key (called a "range key") represented by a second column 1008. In this example, the value key is a phone number, and the range key is a numerical range of the type described above; that is, in this example, each entry 1002-1005 represents a record of a phone number that has been called and a numerical range that is associated with a time of the call. The index 1000 is sorted first by the value key 1006 and is secondarily sorted by the range key 1008. Alternatively, in other examples, the value key can be modified to incorporate the range key (e.g., by concatenating the value of the range key with the value of the value key).

The entry 1003 includes a value of the value key of "Phone Number 1" and a value of the range key of 2 (representing a numerical range corresponding to the quotient 2). In this case, the numerical range of 2 represents a time quantum calculated in the manner shown above using a time stamp associated with one or more records and a numerical granule (e.g., the numerical granule 913).

The entry 1003 is also an example of an entry that is associated with more than one record address. For example, the entry 1003 is associated with three addresses (address 1 1012, address 4 1013, and address 5 1014). Each of the addresses 1012-1014 points to a location within one or more data files 1010 stored in the record storage module 106. Storing numerical ranges such as time quanta as keys in an index facilitates the aggregation or grouping of record addresses within a single entry. For example, while a time stamp may be represented by a 32 bit character string, a numerical range such as a time quantum may be represented by an 8 bit string, as a time quantum may be represented by a single integer instead of a combination of hours, minutes, seconds, and fractions of seconds, depending on the resolution of the time stamp. Furthermore, because numerical ranges such as time quanta can have a coarser granularity than, for example, a time stamp, a given numerical range may be more likely to encompass multiple records. For example, if a numerical range represents a time period of two hours, it is likely that more records are associated with a common two hour time period than a common time stamp, as time stamps can be more precise (and are thus more likely to be unique) than numerical ranges. The address 1012-1014 may also be represented by corresponding entries in the index 1000, as it is not necessary to aggregate them under a single entry. The record addresses associated with each of the entries 1002-1005 may be stored, for example, in one or more additional columns associated with the index 1000, where each column could include one or more of the record addresses associated with an entry.

Storing and indexing records using these techniques may allow queries for records meeting certain criteria to be processed more efficiently. For example, referring again to FIG. 9, the indexing and search module 108 may receive a query from the interface 112. As in the example above, the query may request the retrieval of all records associated with one hour of a single date (e.g., all records associated with a time of 1:00 AM to 2:00 AM on Jun. 1, 2011). The query may be in a form that specifies a particular value of a first attribute to be matched (an attribute corresponding to the value key) and a range of values of a second attribute to be matched (an attribute corresponding to the range key). In this example, the value of the first attribute may represent a called phone number, and the range of values of the second attribute may represent a time period represented by a minimum time (1:00 AM and a maximum time 2:00 AM).

Assuming that the records are grouped in data files by their respective dates (e.g., each data file stores records from a single day), the data file associated with the date of Jun. 1, 2011 would include all of the records that satisfy the query (as well as many records that may not satisfy the query). However, instead of loading the entire data file into memory, a query processing module 910 of the indexing and search module 108 may convert the time period into a form that can be matched against numerical ranges such as time quanta. For example, both the minimum and maximum times that represent the time period can be converted to respective numerical ranges in the manner described above. An example conversion is shown below which assumes that the same numerical granule 913 of 600 seconds is used:

$$NumericalRange_{TimeMin} = \frac{ConvertedTimeStamp}{TimeGranule} = \frac{3600 \text{ sec}}{600 \text{ sec}} = 6$$

$$NumericalRange_{TimeMax} = \frac{ConvertedTimeStamp}{TimeGranule} = \frac{7200 \text{ sec}}{600 \text{ sec}} = 12$$

Accordingly, the time period of 1:00 AM to 2:00 AM specified by the query can be converted to corresponding numerical ranges of 6 and 12, respectively. A modified query may then be carried on the records in the index storage 110 so that an index (e.g., the index 1000) can be searched based on the value key corresponding of the first attribute (e.g., the phone number specified in the query) and the range key corresponding to the second attribute (e.g., the numerical ranges 6-12 generated from the time period specified in the query). Because the index associated with a given data file includes a range key that corresponds to respective time quanta, the indexing and search module 108 is able to determine that only a subset of the records within a given data file are associated with a time quantum between 6 and 12 (we use the term "between" broadly to include, for example, values which are equal to either extremum). As a result, the entire data file need not be loaded into memory, decompressed (if the data file is a compressed data file), and searched; instead, only the records identified in the index as being associated with the time quanta 6 through 12 are decompressed (if the data file is a compressed data file), loaded into memory, and searched. Because each time quantum may include records that fall within a matching time quantum but outside the time period specified in the original query, after records satisfying the query have been decompressed and/or loaded into memory, the indexing and search module 108 may check the loaded records against the original query to identify and exclude any records that do not satisfy the original query. After the check is performed, the remaining records should satisfy the query received from the interface 112, and the resulting records (or a list of those records) can be returned, for example, to a user through the interface 112.

Figure 11:
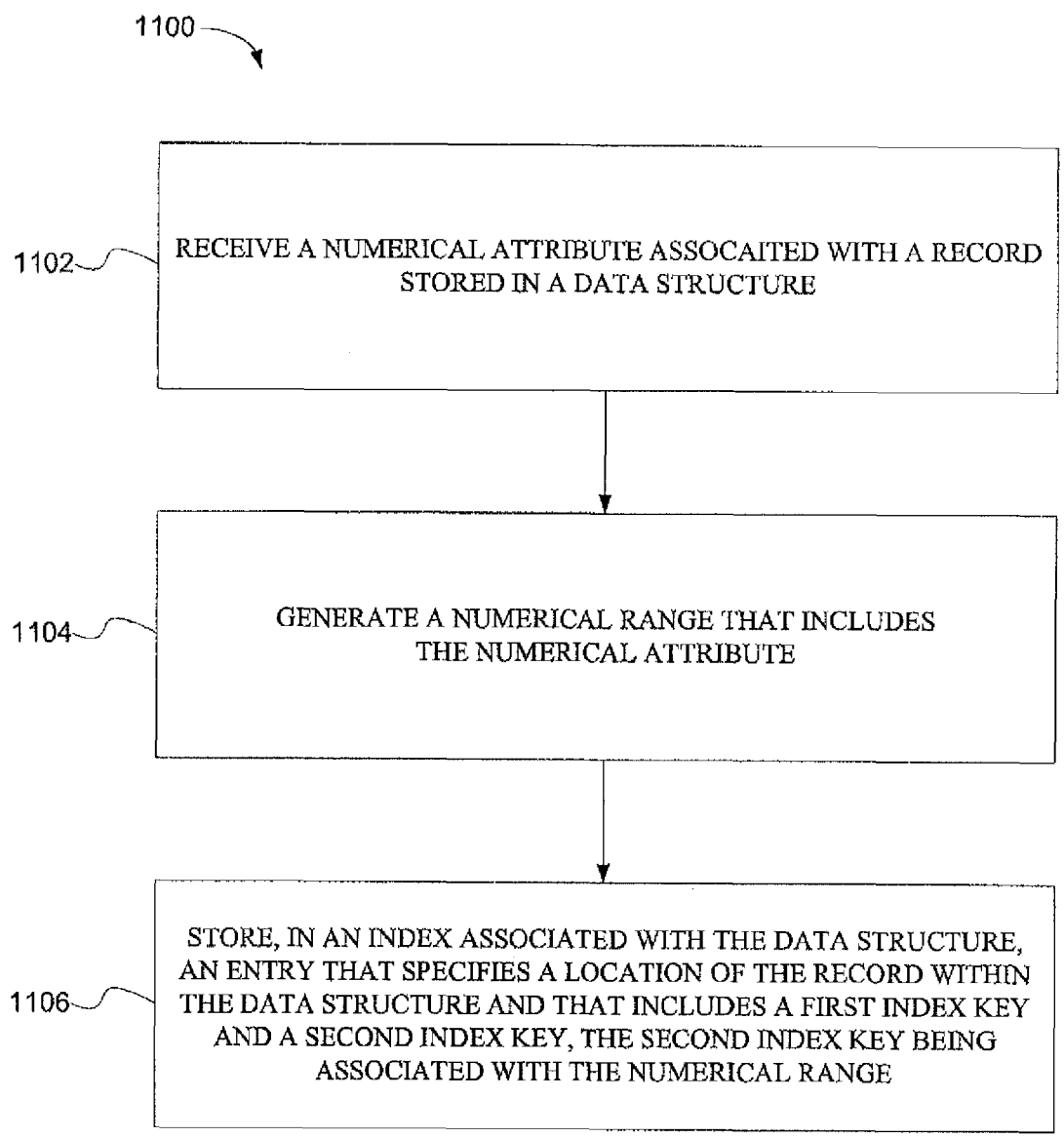
FIG. 11 is a flowchart of a procedure for providing information in an index.

FIG. 11 shows a process 1100 for storing numerical ranges in an index. The process 1100 can be used to create a new index, to create a new entry in an existing index, or to update entries within an existing index.

A numerical attribute associated with a record stored in a data structure is received (1102). For example, a data file may include a record that has an associated numerical attribute, such as a time stamp, and the indexing and search module 108 may access the data file and/or an index associated with the data file to extract the time stamp. Time stamps are only an example of numerical attributes, and may also including numerical orderings (e.g., a linear ordering of one or more items).

A numerical range that includes the numerical attribute is generated (1104). For example, if the numerical attribute is a time stamp, the numerical range can be calculated in the manner described above. For example, a value expressed in time units that separate the time represented by the time stamp from a predetermined point in time (e.g., midnight on a given day) can be determined in order to convert a time stamp to a quantity of time units that can be used for determining a numerical range. The time units can then be divided by a numerical granule (e.g., a time granule) to provide a numerical range. In some examples, numerical granules such as time granules are specified by a user, and may be of any size (e.g., 10 minutes or 6 months).

An entry that specifies a location of the record within the data structure and that includes a value index key and a range index key is stored in an index associated with the data structure, the value of the range index key being associated with the numerical range (1106). For example, an entry can be provided in an index (e.g., the index 1000 in FIG. 10) that includes both a value key and a range key. In some examples, the numerical range associated with the range key is a time quantum.

The record storage and retrieval approach described above, including the modules of the system and the procedures performed by the system, can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for managing storage of data including:
   for each of multiple records stored in a data structure, assigning an identifier that represents a range of values based on an attribute of the record, the range being specific to the record, in which assigning an identifier for a particular record includes:
   determining a value based on a difference between a value of the attribute of the particular record and a first reference value, and
   determining the identifier that represents the range of values for the particular record based on a relationship between the value based on the difference and a second reference value; and
   storing entries in an index associated with the data structure, each entry specifying a location of a corresponding record within the data structure, the storing including, for each entry:
   storing a first index key in the entry, in which the first index key is indicative of the identifier that represents the range of values for the corresponding record, and storing a second index key in the entry, the second index key based on a value stored in the corresponding record, wherein the index is sorted by both (i) the first index key indicative of the identifier that represents the range of values and (ii) the second index key.

2. The method of claim 1, wherein the attribute is represented by a time stamp, and the range of values corresponds to a range of time.

3. The method of claim 2, wherein the first reference value corresponds to a time stamp from a predetermined point in time, and wherein determining a value based on the difference between the value of the attribute of the particular record and the first reference value includes:

determining a first value in time units that separates a time corresponding to the time stamp from the predetermined point in time.

4. The method of claim 3, wherein the second reference value corresponds to a predetermined time duration, and wherein determining the identifier that represents the range of values includes:

dividing the first value by the predetermined time duration to provide a quotient that represents the range of values.

5. The method of claim 1, wherein each entry specifies a location, within the data structure, of a second record that is associated with the first index key and the second index key.

6. The method of claim 5, wherein the record is a first record, and wherein the attribute of the first record and the attribute of the second record are each represented by a different time stamp.

7. The method of claim 5, including:
receiving a query that requests the retrieval of records that are associated with the second index key and that are associated with a time between a first time and a second time.

8. The method of claim 7, including:
assigning first and second identifiers that represent respective ranges of values for the first time and the second time.

9. The method of claim 8, wherein assigning the first and second identifiers that represent the respective ranges of values includes:

determining a second value in time units based on a separation between the first time and a second predetermined point in time; and determining a third value in time units based on a separation between the second time and the second predetermined point in time.

10. The method of claim 9, wherein assigning the first and second identifiers that represent the respective ranges of values includes:

dividing the second value by a predetermined time duration to provide a quotient that represents a numerical range for the first time; and dividing the third value by the predetermined time duration to provide a quotient that represents a numerical range for the second time.

11. The method of claim 10, including:
identifying one or more entries within the index that include the second index key, and that include a first index key that corresponds to the range of values for the first time or the range of values for the second time or that is between the respective ranges of values for the first time and the second time.

12. The method of claim 1, wherein the entries are sorted in the index primarily by the first index key indicative of the identifier that represents the range of values.

13. The method of claim 1, wherein the entries are sorted in the index primarily by the second index key.

14. The method of claim 1, wherein the attribute has a value that satisfies the range of values.

15. The method of claim 14, wherein the value of the attribute is within the range of values.

16. The method of claim 1, wherein determining the identifier that represents the range of values comprises dividing the value based on the difference by the second reference value to provide a quotient that represents the range of values.

17. A non-transitory computer-readable storage medium storing a computer program for managing the storage of data, the computer program including instructions for causing a computing system to:

for each of multiple records stored in a data structure, assigning an identifier that represents a range of values based on an attribute of the record, the range being specific to the record, in which assigning an identifier for a particular record includes:

determining a value based on a difference between a value of the attribute of the particular record and a first reference value, and determining the identifier that represents the range of values for the particular record based on a relationship between the value based on the difference and a second reference value; and store entries in an index associated with the data structure, each entry specifying a location of a corresponding record within the data structure, the storing including, for each entry:

storing a first index key in the entry, in which the first index key is indicative of the identifier that represents the range of values for the corresponding record, and storing a second index key in the entry, the second index key based on a value stored in the corresponding record, wherein the index is sorted by both (i) the first index key indicative of the identifier that represents the range of values and (ii) the second index key.

18. The non-transitory computer-readable storage medium of claim 17, wherein the attribute is represented by a time stamp, and the range of values corresponds to a range of time.

19. The non-transitory computer-readable storage medium of claim 18, wherein the first reference value corresponds to a time stamp from a predetermined point in time, and wherein determining a value based on the difference between the value of the attribute of the particular record and the first reference value includes:

determining a first value in time units that separates a time corresponding to the time stamp from the predetermined point in time.

20. The non-transitory computer-readable storage medium of claim 19, wherein the second reference value corresponds to a predetermined time duration, and wherein determining the identifier that represents the range of values includes:

dividing the first value by the predetermined time duration to provide a quotient that represents the range of values.

21. The non-transitory computer-readable storage medium of claim 17, wherein each entry specifies a location, within the data structure, of a second record that is associated with the first index key and the second index key.

22. The non-transitory computer-readable storage medium of claim 21, wherein the record is a first record, and wherein the attribute of the first record and the attribute of the second record are each represented by a different time stamp.

23. The non-transitory computer-readable storage medium of claim 21, including instructions for causing a computing system to:
    receive a query that requests the retrieval of records that are associated with the second index key and that are associated with a time between a first time and a second time.

24. The non-transitory computer-readable storage medium of claim 23, including instructions for causing a computing system to:
    assign first and second identifiers that represent respective ranges of values for the first time and the second time.

25. The non-transitory computer-readable storage medium of claim 24, wherein assigning the first and second identifiers that represent the respective ranges of values includes:
    determining a second value in time units based on a separation between the first time and a second predetermined point in time; and
    determining a third value in time units based on a separation between the second time and the second predetermined point in time.

26. The non-transitory computer-readable storage medium of claim 25, wherein assigning the first and second identifiers that represent the respective ranges of values includes:
    dividing the second value by a predetermined time duration to provide a quotient that represents a numerical range for the first time; and
    dividing the third value by the predetermined time duration to provide a quotient that represents a numerical range for the second time.

27. The non-transitory computer-readable storage medium of claim 26, including instructions for causing a computing system to:
    identify one or more entries within the index that include the second index key, and that include a first index key that corresponds to the range of values for the first time or the range of values for the second time or that is between the respective ranges of values for the first time and the second time.

28. The non-transitory computer-readable storage medium of claim 17, wherein the attribute has a value that satisfies the range of values.

29. The non-transitory computer-readable storage medium of claim 28, wherein the value of the attribute is within the range of values.

30. The non-transitory computer-readable storage medium of claim 17, wherein determining the identifier that represents the range of values comprises dividing the value based on the difference by the second reference value to provide a quotient that represents the range of values.

31. A computing system for managing the storage of data, the computing system including:
    at least one processor configured to:
        for each of multiple records stored in a data structure, assigning an identifier that represents a range of values based on an attribute of the record, the range being specific to the record, in which assigning an identifier for a particular record includes:
            determining a value based on a difference between a value of the attribute of the particular record and a first reference value, and
            determining the identifier that represents the range of values for the particular record based on a relationship between the value based on the difference and a second reference value; and
        store entries in an index associated with the data structure, each entry specifying a location of a corresponding record within the data structure, the storing including, for each entry:
            storing a first index key in the entry, in which the first index key is indicative of the identifier that represents the range of values for the corresponding record, and
            storing a second index key in the entry, the second index key based on a value stored in the corresponding record,
            wherein the index is sorted by both (i) the first index key indicative of the identifier that represents the range of values and (ii) the second index key.

32. The computing system of claim 31, wherein the attribute is represented by a time stamp, and the range of values corresponds to a range of time.

33. The computing system of claim 32, wherein the first reference value corresponds to a time stamp from a predetermined point in time, and wherein determining a value based on the difference between the value of the attribute of the particular record and the first reference value includes:
    determining a first value in time units that separates a time corresponding to the time stamp from the predetermined point in time.

34. The computing system of claim 33, wherein the second reference value corresponds to a predetermined time duration, and wherein determining the identifier that represents the range of values includes:
    dividing the first value by the predetermined time duration to provide a quotient that represents the range of values.

35. The computing system of claim 31, wherein each entry specifies a location, within the data structure, of a second record that is associated with the first index key and the second index key.

36. The computing system of claim 35, wherein the record is a first record, and wherein the attribute of the first record and the attribute of the second record are each represented by a different time stamp.

37. The computing system of claim 35, the at least one processor configured to:
    receive a query that requests the retrieval of records that are associated with the second index key and that are associated with a time between a first time and a second time.

38. The computing system of claim 37, the at least one processor configured to:
    assign first and second identifiers that represent respective ranges of values for the first time and the second time.

39. The computing system of claim 38, wherein assigning the first and second identifiers that represent the respective ranges of values includes:
    determining a second value in time units based on a separation between the first time and a second predetermined point in time; and
    determining a third value in time units based on a separation between the second time and the second predetermined point in time.

40. The computing system of claim 39, wherein assigning the first and second identifiers that represent the respective ranges of values includes:

dividing the second value by a predetermined time duration to provide a quotient that represents a numerical range for the first time; and dividing the third value by the predetermined time duration to provide a quotient that represents a numerical range for the second time.

41. The computing system of claim 40, the at least one processor configured to:

identify one or more entries within the index that include the second index key, and that include a first index key that corresponds to the range of values for the first time or the range of values for the second time or that is between the respective ranges of values for the first time and the second time.

42. The computing system of claim 31, wherein the attribute has a value that satisfies the range of values.

43. The computing system of claim 42, wherein the value of the attribute is within the range of values.

44. The computing system of claim 31, wherein determining the identifier that represents the range of values comprises dividing the value based on the difference by the second reference value to provide a quotient that represents the range of values.

45. A computing system for managing the storage of data, the computing system including:

means for indexing one or more records, the indexing including:

for each of multiple records stored in a data structure, assigning an identifier that represents a range of values based on an attribute of the record, the range being specific to the record, in which assigning an identifier for a particular record includes:

determining a value based on a difference between a value of the attribute of the particular record and a first reference value, and determining the identifier that represents the range of values for the particular record based on a relationship between the value based on the difference and a second reference value; and storing entries in an index associated with the data structure, each entry specifying a location of a corresponding record within the data structure, the storing including, for each entry:

storing a first index key in the entry, in which the first index key is indicative of the identifier that represents the range of values for the corresponding record, and storing a second index key in the entry, the second index key based on a value stored in the corresponding record, wherein the index is sorted by both (i) the first index key indicative of the identifier that represents the range of values and (ii) the second index key.

46. The computing system of claim 45, wherein the attribute is represented by a time stamp, and the range of values corresponds to a range of time.

47. The computing system of claim 46, wherein the first reference value corresponds to a time stamp from a predetermined point in time, and wherein determining a value based on the difference between the value of the attribute of the particular record and the first reference value includes:

determining a first value in time units that separates a time corresponding to the time stamp from the predetermined point in time.

48. The computing system of claim 47, wherein the second reference value corresponds to a predetermined time duration, and wherein determining the identifier that represents the range of values includes:

dividing the first value by the predetermined time duration to provide a quotient that represents the range of values.

49. The computing system of claim 45, wherein each entry specifies a location, within the data structure, of a second record that is associated with the first index key and the second index key.

50. The computing system of claim 49, wherein the record is a first record, and wherein the attribute of the first record and the attribute of the second record are each represented by a different time stamp.

51. The computing system of claim 49, the indexing including:

receiving a query that requests the retrieval of records that are associated with the second index key and that are associated with a time between a first time and a second time.

52. The computing system of claim 51, the indexing including:

assigning first and second identifiers that represent respective ranges of values for the first time and the second time.

53. The computing system of claim 45, wherein the attribute has a value that satisfies the range of values.

54. The computing system of claim 53, wherein the value of the attribute is within the range of values.

* * * * *